United States Patent
Hams

(10) Patent No.: US 8,001,480 B2
(45) Date of Patent: Aug. 16, 2011

(54) APPARATUS AND METHOD FOR DEFINING AND CONTROLLING GRAPHICAL FACEPLATES IN A PROCESS CONTROL SYSTEM

(75) Inventor: Colin Hams, Chermside (AU)

(73) Assignee: Honeywell International Inc., Morristown, NJ (US)

(*) Notice: Subject to any disclaimer, the term of this patent is extended or adjusted under 35 U.S.C. 154(b) by 851 days.

(21) Appl. No.: 12/029,611

(22) Filed: Feb. 12, 2008

(65) Prior Publication Data

US 2009/0157200 A1 Jun. 18, 2009

Related U.S. Application Data

(60) Provisional application No. 61/007,942, filed on Dec. 17, 2007.

(51) Int. Cl.
*G06F 3/038* (2006.01)
(52) U.S. Cl. ........................................ 715/771
(58) Field of Classification Search ............ 715/771
See application file for complete search history.

(56) References Cited

U.S. PATENT DOCUMENTS

| | | |
|---|---|---|
| 6,289,299 B1 | 9/2001 | Daniel, Jr. et al. |
| 6,629,003 B1 | 9/2003 | Frizzell et al. |
| 6,952,808 B1 | 10/2005 | Jamieson et al. |
| 2006/0069474 A1 | 3/2006 | Dietsch et al. |
| 2007/0132779 A1* | 6/2007 | Gilbert et al. ............. 345/619 |
| 2008/0244449 A1 | 10/2008 | Morrison et al. |

FOREIGN PATENT DOCUMENTS

EP 0592921 A1 4/1994

OTHER PUBLICATIONS

"Fab wide e-Diagnostics-solution for your Equipment", AIS Automation Dresden GmbH, Apr. 2004, 5 pages.
"Remote Task Manager, Reference Guide", SmartLine, Inc., 2004, 73 pages.
"Remote Task manager fur intelligente Systemsteuerung" Presseinformation, vom 28, Jun. 2004, 7 pages.

* cited by examiner

*Primary Examiner* — Weilun Lo
*Assistant Examiner* — Peiyong Weng
(74) *Attorney, Agent, or Firm* — Munck Carter, LLP

(57) ABSTRACT

A method includes receiving information identifying one or more elements to be presented in a first faceplate. The first faceplate is associated with control of a process system. The method also includes receiving information identifying an auto-selection behavior associated with the first faceplate. The method further includes displaying the first faceplate to an operator and automatically selecting one of the elements in the first faceplate based on the received information. A centralized component (like a faceplate controller) automatically selects elements in multiple faceplates, including the first faceplate. The centralized component could automatically select the element to receive focus in the first faceplate. The centralized component could also identify a specified element associated with a command to be executed, even when the specified element does not have focus in the first faceplate.

21 Claims, 13 Drawing Sheets

APPARATUS AND METHOD FOR DEFINING AND CONTROLLING GRAPHICAL FACEPLATES IN A PROCESS CONTROL SYSTEM

CROSS-REFERENCE TO RELATED APPLICATIONS

This application claims priority under 35 U.S.C. §119(e) to U.S. Provisional Application No. 61/007,942 filed on Dec. 17, 2007, which is hereby incorporated by reference.

TECHNICAL FIELD

This disclosure relates generally to process control systems and more specifically to an apparatus and method for defining and controlling graphical faceplates in a process control system.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

One of the most important functions of process control systems is the ability to provide effective tools for operators to monitor and control processes. These tools often include process schematics that graphically illustrate the processes being controlled. These tools also often include graphical faceplates, which typically can be displayed over a process schematic and are used to control a process. For example, faceplates can be used by operators to set desired process targets, monitor for discrepancies against process targets, change modes of operation, and make modifications to a process.

In the past, faceplates have been associated with scripts that could be executed to automatically select elements within the faceplates. For example, a script could allow a particular element in a faceplate to be highlighted so that an operator can immediately change that element (without requiring the operator to manually select that element in the faceplate). As particular examples, a script could automatically select a faceplate parameter (such as an SP, OP, or mode parameter) based on a selected mode or a received command. While this may reduce the need for an operator to manually select an element in a faceplate, some view this functionality as a security or safety hazard. For instance, a script that detected a command could not accurately determine if the command was meant to be handled by a particular faceplate or another display, and sometimes the script would execute when it was not meant to be. Consequently, if two operators were viewing the same faceplate on different consoles and one operator changed the mode, this would cause the faceplate to auto-select for both operators, which was seen as a safety hazard since the other operator did not change the mode. Moreover, some faceplates may implement the scripts incorrectly, and other faceplates may lack the proper scripts altogether.

SUMMARY

This disclosure provides an apparatus and method for defining and controlling graphical faceplates in a process control system.

In a first embodiment, a method includes receiving information identifying one or more elements to be presented in a first faceplate, where the first faceplate is associated with control of a process system. The method also includes receiving information identifying an auto-selection behavior associated with the first faceplate. The method further includes displaying the first faceplate to an operator. In addition, the method includes automatically selecting one of the elements in the first faceplate based on the received information. A centralized component automatically selects elements in multiple faceplates including the first faceplate.

In particular embodiments, the information identifying the one or more elements includes information identifying a setpoint element, an output element, and/or a mode element associated with the first faceplate.

In other particular embodiments, the information identifying the auto-selection behavior includes an identification of an element to receive focus in the first faceplate. Also, automatically selecting one of the elements includes automatically placing focus on the element in the displayed first faceplate. The element that receives focus in the displayed first faceplate could include (i) a setpoint element or an output element and/or (ii) a user-specified element. The setpoint element may receive focus when a mode element has a first value, and the output element may receive focus when the mode element has a second value. The setpoint element or the output element may receive focus in the displayed first faceplate in response to an invocation of the first faceplate, a re-invocation of the first faceplate, and/or a change in the mode element initiated by the operator. The user-specified element may receive focus in the displayed first faceplate in response to the invocation of the first faceplate and/or the re-invocation of the first faceplate.

In yet other particular embodiments, the information identifying the auto-selection behavior includes an identification of a specified element associated with a command to be executed. Also, automatically selecting one of the elements includes executing the command in association with the specified element, even when the specified element does not have focus in the displayed first faceplate.

In still other particular embodiments, receiving the information identifying the one or more elements and receiving the information identifying the auto-selection behavior includes receiving the information at the centralized component through a graphical user interface. The graphical user interface presents information and settings related to configuration of multiple types of graphical displays.

In additional particular embodiments, the first faceplate is associated with a piece of industrial equipment that is controlled by a process control system. The operator adjusts the control of the piece of industrial equipment using the first faceplate.

In a second embodiment, an apparatus includes a memory configured to store information identifying one or more elements to be presented in each of multiple faceplates, where the faceplates are associated with control of a process system. The memory is also configured to store information identifying an auto-selection behavior associated with the each of the faceplates. The apparatus also includes a faceplate controller configured to automatically select one of the elements in a first of the faceplates in accordance with the auto-selection behavior associated with the first faceplate when the first faceplate is displayed to an operator.

In particular embodiments, the faceplate controller is also configured to determine when the operator places focus on a graphical display other than the first faceplate before focus is placed on the element in the first faceplate. The faceplate controller is further configured to not place focus on the element in the first faceplate in response to the determination.

In a third embodiment, a computer program is embodied on a computer readable medium. The computer program includes computer readable program code for receiving information identifying one or more elements to be presented in each of multiple faceplates, where the faceplates are associated with control of a process system. The computer program also includes computer readable program code for receiving information identifying an auto-selection behavior associated with the each of the faceplates. In addition, the computer program includes computer readable program code for (i) automatically selecting one of the elements in a first of the faceplates in accordance with the auto-selection behavior associated with the first faceplate when the first faceplate is displayed to an operator and (ii) automatically selecting one of the elements in a second of the faceplates in accordance with the auto-selection behavior associated with the second faceplate when the second faceplate is displayed to the operator.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 18, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
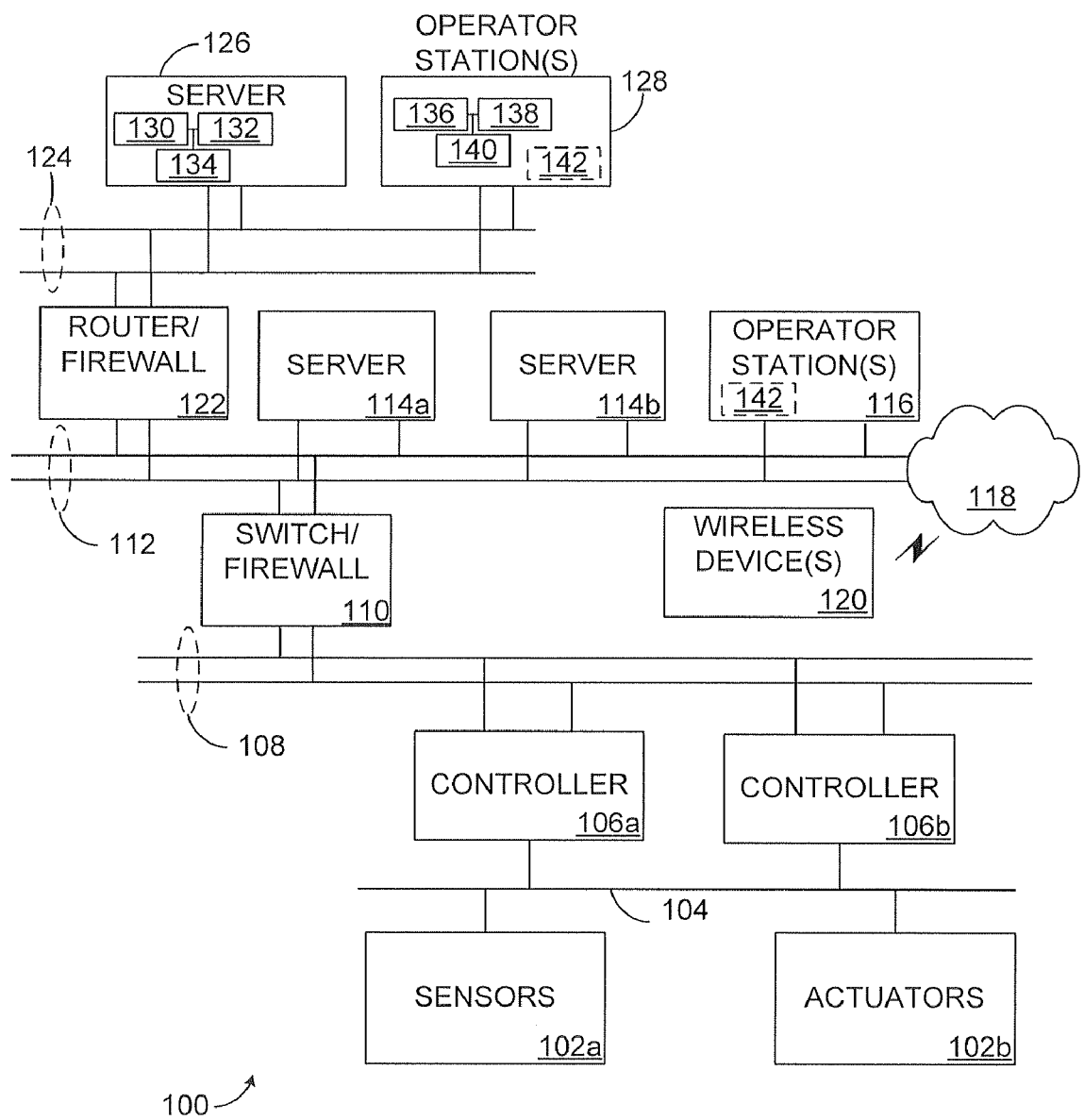
FIG. 1 illustrates an example process control system according to this disclosure.

FIG. 1 illustrates an example process control system 100 according to this disclosure. The embodiment of the process control system 100 shown in FIG. 1 is for illustration only. Other embodiments of the process control system 100 may be used without departing from the scope of this disclosure.

In this example embodiment, the process control system 100 includes various components that facilitate production or processing of at least one product or other material, such as one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system, such as heaters, motors, catalytic crackers, or valves. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting conditions in a process system. Also, a process system may generally represent any system or portion thereof configured to process one or more products or other materials in some manner.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

Two controllers 106a-106b are coupled to the network 104. The controllers 106a-106b may, among other things, use the measurements from the sensors 102a to control the operation of the actuators 102b. For example, the controllers 106a-106b could receive measurement data from the sensors 102a and use the measurement data to generate control signals for the actuators 102b. Each of the controllers 106a-106b includes any hardware, software, firmware, or combination thereof for interacting with the sensors 102a and controlling the actuators 102b. The controllers 106a-106b could, for example, represent multivariable controllers or other types of controllers. As a particular example, each of the controllers 106a-106b could represent a computing device running a MICROSOFT WINDOWS operating system.

Two networks 108 are coupled to the controllers 106a-106b. The networks 108 facilitate interaction with the controllers 106a-106b, such as by transporting data to and from the controllers 106a-106b. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

Two servers 114a-114b are coupled to the networks 112. The servers 114a-114b perform various functions to support the operation and control of the controllers 106a-106b, sensors 102a, and actuators 102b. For example, the servers 114a-114b could log information collected or generated by the controllers 106a-106b, such as measurement data from the sensors 102a or control signals for the actuators 102b. The servers 114a-114b could also execute applications that control the operation of the controllers 106a-106b, thereby controlling the operation of the actuators 102b. In addition, the servers 114a-114b could provide secure access to the controllers 106a-106b. Each of the servers 114a-114b includes any hardware, software, firmware, or combination thereof for providing access to, control of, or operations related to the controllers 106a-106b. Each of the servers 114a-114b could, for example, represent a computing device running a MICROSOFT WINDOWS operating system.

One or more operator stations 116 are coupled to the networks 112. The operator stations 116 represent computing or communication devices providing user access to the servers 114a-114b, which could then provide user access to the controllers 106a-106b (and possibly the sensors 102a and actuators 102b). As particular examples, the operator stations 116 could allow users to review the operational history of the sensors 102a and actuators 102b using information collected by the controllers 106a-106b and/or the servers 114a-114b. The operator stations 116 could also allow the users to adjust the operation of the sensors 102a, actuators 102b, controllers 106a-106b, or servers 114a-114b. In addition, the operator stations 116 could receive and display warnings, alerts, or other messages or displays generated by the controllers 106a-106b or the servers 114a-114b. Each of the operator stations 116 includes any hardware, software, firmware, or combination thereof for supporting user access and control of the system 100. Each of the operator stations 116 could, for example, represent a computing device running a MICROSOFT WINDOWS operating system.

In this example, the system 100 also includes a wireless network 118, which can be used to facilitate communication with one or more wireless devices 120. The wireless network 118 may use any suitable technology to communicate, such as radio frequency (RF) signals. Also, the wireless devices 120 could represent devices that perform any suitable functions. The wireless devices 120 could, for example, represent wireless sensors, wireless actuators, and remote or portable operator stations or other user devices.

At least one router/firewall 122 couples the networks 112 to two networks 124. The router/firewall 122 includes any suitable structure for providing communication between networks, such as a secure router or combination router/firewall. The networks 124 could represent any suitable networks, such as a pair of Ethernet networks or an FTE network.

In this example, the system 100 includes at least one additional server 126 coupled to the networks 124. The server 126 executes various applications to control the overall operation of the system 100. For example, the system 100 could be used in a processing plant or other facility, and the server 126 could execute applications used to control the plant or other facility. As particular examples, the server 126 could execute applications such as enterprise resource planning (ERP), manufacturing execution system (MES), or any other or additional plant or process control applications. The server 126 includes any hardware, software, firmware, or combination thereof for controlling the overall operation of the system 100.

One or more operator stations 128 are coupled to the networks 124. The operator stations 128 represent computing or communication devices providing, for example, user access to the servers 114a-114b, 126. Each of the operator stations 128 includes any hardware, software, firmware, or combination thereof for supporting user access and control of the system 100. Each of the operator stations 128 could, for example, represent a computing device running a MICROSOFT WINDOWS operating system.

In particular embodiments, the various servers and operator stations may represent computing devices. For example, each of the servers 114a-114b, 126 could include one or more processors 130 and one or more memories 132 for storing instructions and data used, generated, or collected by the processor(s) 130. Each of the servers 114a-114b, 126 could also include at least one network interface 134, such as one or more Ethernet interfaces. Also, each of the operator stations 116, 128 could include one or more processors 136 and one or more memories 138 for storing instructions and data used, generated, or collected by the processor(s) 136. Each of the operator stations 116, 128 could also include at least one network interface 140, such as one or more Ethernet interfaces.

Figure 2:
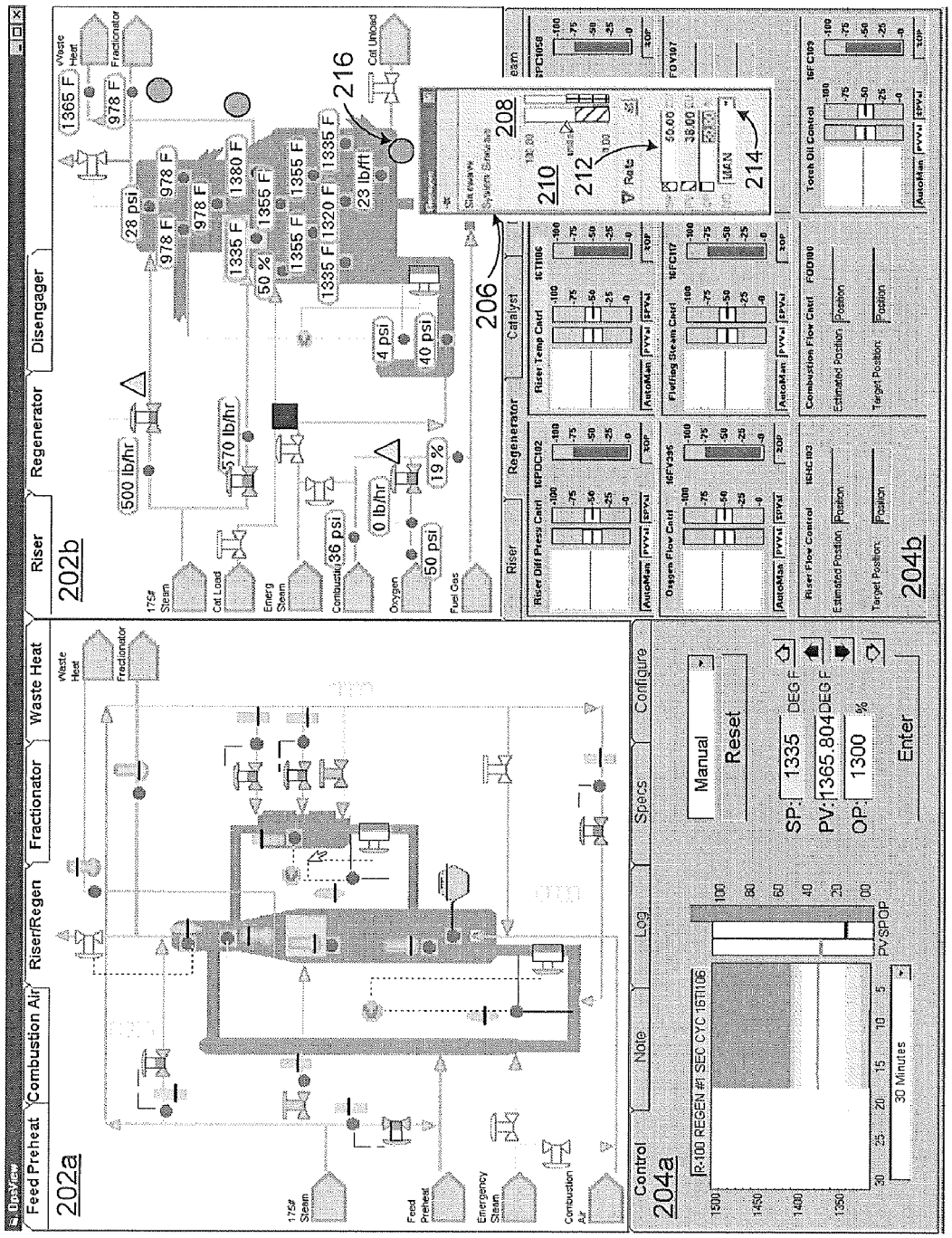
FIG. 2 illustrates an example graphical display having a faceplate according to this disclosure.

In one aspect of operation, to facilitate control over a process system, the operator stations 116, 128 may include one or more human-machine interface (HMI) applications 142. An HMI application 142 generally represents an application that generates graphical displays for presenting content to operators. The graphical displays visually represent one or more processes (or portions thereof) being monitored and/or controlled by the operators. An HMI application 142 can present any suitable graphical data to an operator, such as a process schematic that graphically illustrates a process to be controlled. The graphical data could also include faceplates, which provide a primary user interface element for setting process targets, monitoring for discrepancies against targets, changing modes of operation, making process moves, and otherwise monitoring and/or controlling a process. One example of a graphical display including a faceplate is shown in FIG. 2, which is described below.

Faceplates are often in continual use in a process control system and are often used with operations that are at most risk of causing plant upsets, outages, or safety concerns. In these or other types of situations, operators often need to be able to very quickly call up a faceplate and perform control actions. The operators also often need to be able to respond immediately to isolate failures and keep a process under control. Consider the following example. A console operator is undertaking a startup activity for a boiler unit. This may require the operator to open a number of valves. A refinery console may include thousands of controllable valves, and the operator needs to be able to call up a schematic, choose a valve, control that valve, and move to the next schematic to control another valve in quick succession. The operator may also need to be able to control multiple valves concurrently. It therefore needs to be clear which valve is currently being adjusted or controlled by the operator. Speed is often critical here, and the operator cannot afford to spend time using a mouse, trackball, or keyboard to select the most appropriate element for control in a faceplate. The operator needs to control the valve and move on as soon as possible. As a result, faceplates often need to effectively and clearly communicate the current state of a process and allow the operator to make necessary changes to the control of the process in a timely, direct, and intuitive manner.

In accordance with this disclosure, functionality is provided (either in the HMI application 142 or elsewhere) for auto-selection within faceplates. "Auto-selection" generally refers to the automatic selection of an element within a faceplate. For example, when a faceplate is displayed to an operator, auto-selection can occur to select the most appropriate element within the faceplate, automatically placing that element in focus. "Focus" generally refers to the element of a faceplate that is currently selected. This allows the operator to quickly change that element within the faceplate without requiring the operator to first manually select that element. Also, auto-selection can be used to support selection-independent commands, meaning certain commands can be executed within the faceplate regardless of what has focus within the faceplate. For instance, a mode change command could be used to change a mode element in the faceplate, regardless of whether the mode element has focus.

To support this functionality, various aspects of faceplate operation can be abstracted, defined, and controlled by system designers or other personnel. This allows the behavior of a particular faceplate to be quickly and easily customized. In particular, this may allow personnel to quickly define how an element is auto-selected in a particular faceplate and to define how selection-independent commands are treated by a faceplate.

Among other things, this functionality can help to reduce the need for an operator to use a computer's mouse or other input device to select elements in faceplates. Also, some process system owners or operators may not want auto-selection to occur, such as when they do not want an element to be automatically selected or commands to be executed regardless of focus. These people may, for instance, see this functionality as a potential safety risk. As a result, the auto-selection functionality may be configurable, allowing the functionality to be enabled or disabled for individual faceplates, groups of faceplates, or all faceplates in the system 100 (such as via a single mouse-click). When enabled, the auto-selection functionality could be consistent across all faceplates in which the functionality is supported, and any required changes or enhancements in functionality can be applied easily and with a minimum of effort to all faceplates in which the functionality is supported.

Each HMI application 142 includes any suitable hardware, software, firmware, or combination thereof for generating graphical displays representing at least part of a process being monitored and/or controlled. As a particular example, the HMI application 142 could use HMIWEB technology from HONEYWELL INTERNATIONAL INC. The HMIWEB technology uses hypertext markup language (HTML) and allows users to build process control displays (web pages) that are loaded onto operator stations 116, 128. The HTML displays may use INTERNET EXPLORER or other browser technology to extend the functionality of the web pages to allow process information to be displayed and to allow operators to control processes via the web pages. In particular embodiments, the HMI application 142 can operate within a larger system, such as within EXPERION systems from HONEYWELL INTERNATIONAL INC.

Although FIG. 1 illustrates one example of a process control system 100, various changes may be made to FIG. 1. For example, a control system could include any number of sensors, actuators, controllers, servers, operator stations, networks, and HMI or other applications. Also, the makeup and arrangement of the process control system 100 in FIG. 1 is for illustration only. Components could be added, omitted, combined, or placed in any other suitable configuration according to particular needs. In addition, FIG. 1 illustrates one operational environment in which faceplate design and control can be used. This functionality could be used in any other suitable device or system.

FIG. 2 illustrates an example graphical display 200 having a faceplate according to this disclosure. The embodiment of the graphical display 200 shown in FIG. 2 is for illustration only. Other graphical displays supporting faceplates with auto-selection functionality could be used without departing from the scope of this disclosure.

In this example, the graphical display 200 includes a process schematic formed by two displays 202a-202b. The display 202a represents a larger process (or portion thereof), and the display 202b represents a smaller part of the process presented in the display 202a (or portion thereof). The displays 202a-202b therefore can collectively represent the process to be controlled by an operator in graphical form. Each of the displays 202a-202b also includes various information and controls 204a-204b, which can be used to monitor and control various aspects of the process.

A faceplate 206 is also shown in FIG. 2. The faceplate 206 is associated with one or more process variables. Process variables typically include measurable characteristics and calculated values (which are often based on measurable characteristics) used during process control. Process variables are typically divided into controlled variables, manipulated variables, and disturbance variables. Controlled variables represent values to be controlled, such as flow rate in a pipe. Manipulated variables represent values that are adjusted to control the controlled variables, such as a valve opening in the pipe. Disturbance variables represent values that can be taken into account when controlling the controlled variables but that are generally not controllable, such as ambient temperature. The faceplate 206 generally presents information associated with one or more process variables to an operator and allows the operator to control various aspects of the process variables (such as process variable setpoints and modes in which the process variables are controlled). In this way, the faceplate 206 provides a quick and easy way for the operator to review information about the process being controlled and to make adjustments to the control of that process.

In this example embodiment, the faceplate 206 includes a heading 208, which includes general information about the faceplate (such as its name and description). Graphs 210 graphically illustrate different values associated with the faceplate. In this example, the left graph plots the current process value (PV) of a process variable, such as the actual measured or determined value of the process variable. The triangle next to this graph represents the process variable's setpoint, which is the desired value of the process variable. The right graph plots an output value (OP), which generally represents a signal used to control a component in a process system.

The faceplate 206 also includes controls 212-214 for controlling an aspect of the process system. The control 212 represents text boxes that allow an operator to specify the setpoint (SP) and output (OP) values. The operator can enter different values into the text boxes to change the way that this aspect of the process system is controlled. The control 214 represents a drop-down menu used to select the mode for controlling this aspect of the process system. Among other things, the control 214 could be used to specify whether a particular process variable is controlled automatically by a controller ("Auto") or manually by an operator ("Man"). These represent only examples of the types of controls that could be presented and used in the faceplate 206.

In this example, the faceplate 206 can be displayed upon selection of an icon 216 in the display 202a, where the icons 216 represent different types of process variables (controlled=circle, manipulated=triangle, square=disturbance). This represents one specific use of faceplates and is provided only as an illustration of how faceplates can be used to control a process. Additional details regarding this specific use of faceplates can be found in U.S. patent application Ser. No. 11/944,693, which is hereby incorporated by reference.

Auto-selection can be used in the faceplate 206 in the following ways, which are provided as non-limiting examples and presented merely for illustration. As described in more detail below, when certain actions occur (such as invocation of the faceplate 206 by an operator), the faceplate 206 can be presented to the operator, and focus can be automatically placed on one of the text boxes in the control 212. This may allow the operator to quickly change the setpoint or output value without needing to manually select one of the text boxes. The text box selected during auto-selection could vary, such as when the text box is selected based on the current value of the mode. Also, selection-independent commands can be implemented in the faceplate 206, such as when a mode change command is executed regardless of whether the control 214 has focus.

Although FIG. 2 illustrates one example of a graphical display 200 having a faceplate, various changes may be made to FIG. 2. For example, faceplates can be used in a wide variety of ways, and any other or additional uses may be supported (in the system 100 or in any other suitable system).

Figure 3A:
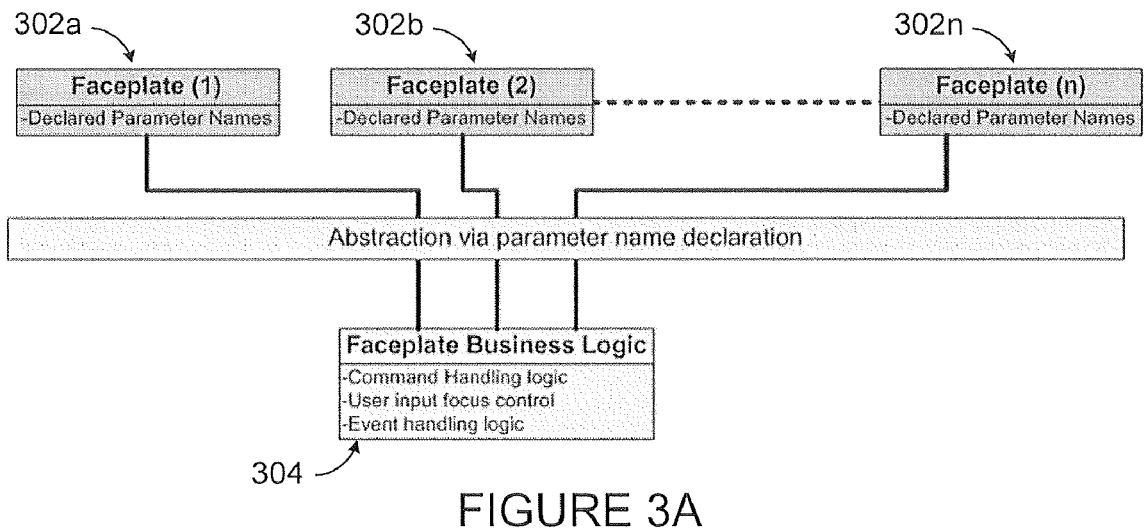
FIGS. 3A through 3C illustrate example graphical faceplate operations in a process control system according to this disclosure.
Figure 3B:
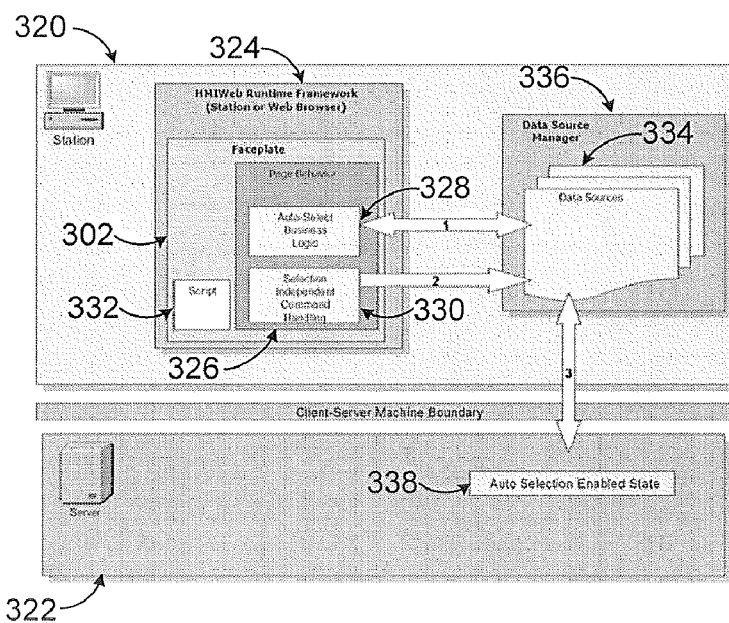
Figure 3C:
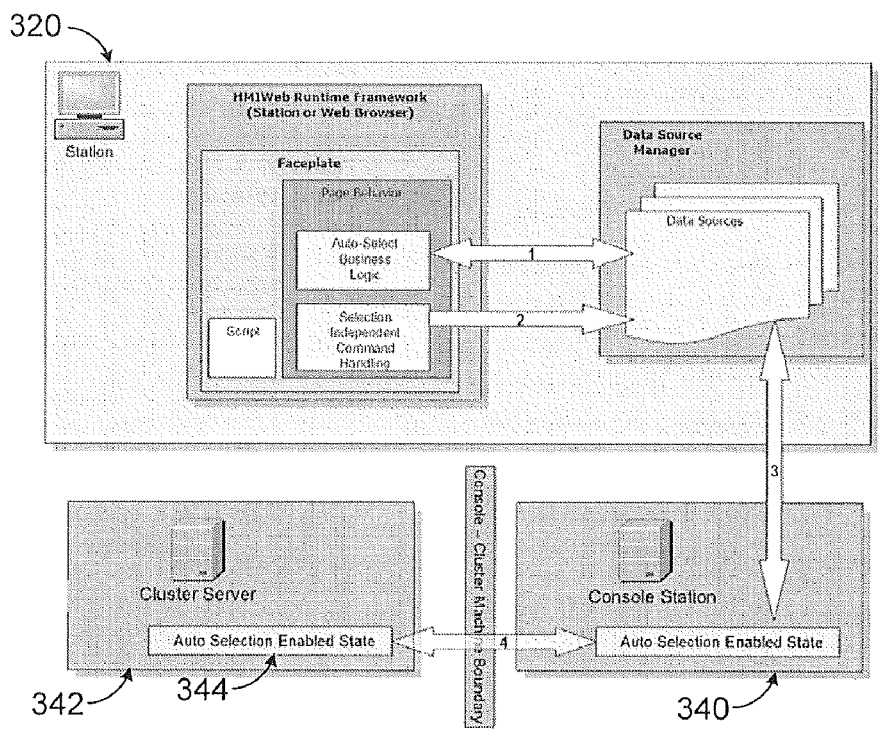

FIGS. 3A through 3C illustrate example graphical faceplate operations in a process control system according to this disclosure. The various operations shown in FIGS. 3A through 3C are for illustration only. Other embodiments of a process control system may operate in a different manner without departing from the scope of this disclosure.

As shown in FIG. 3A, various aspects of multiple faceplates 302a-302n can be abstracted. For example, each of the faceplates 302a-302n could be associated with one or more parameters, which define the appearance and the behavior (including the auto-selection behavior) of that faceplate. Each of these parameters can be declared to have a particular value. Ordinarily, the behavior of a faceplate is controlled by the declared parameters for that faceplate. To support the auto-selection functionality described above, faceplate-specific behavior is abstracted into a reusable business logic component 304. Parameters of individual faceplates can then be specified via parameter name declaration. In other words, the business logic component 304 supports various functions, such as auto-selection of parameters and selection-independent command handling for the faceplates. The business logic component 304 can therefore represent a centralized component that can control auto-selection in more than one faceplate, and the business logic component 304 can be referred to as a faceplate controller. This provides a convenient and easy way to implement this functionality in numerous faceplates across a process control system. The business logic component 304 includes any hardware, software, firmware, or combination thereof for supporting auto-selection in multiple faceplates. In some embodiments, the business logic component 304 could represent a component object model (COM) component.

FIG. 3B illustrates one example context in which this abstraction of faceplate functionality can be implemented. In FIG. 3B, a station 320 (such as an operator station 116, 128) is in communication with a server 322 (such as a server 114a-114b, 126). The station 320 includes a framework 324 (such as the HMIWEB framework), which supports the execution of various functions in the station 320. One or more faceplates 302 are supported in or provided by the framework 324, and each faceplate 302 includes behavior that encapsulates the auto-selection functionality.

In this example, each faceplate 302 is associated with page behavior 326, which provides HMIWEB page functionality (such as Page-level events). The business logic component 304 is supported within the page behavior 326 in the form of auto-select business logic 328 and command handling logic 330. The auto-select business logic 328 provides the logic for performing auto-selection of an element within a faceplate, where this selection occurs within the page behavior 326. The command handling logic 330 provides the logic for performing selection-independent commands. One or more scripts 332 can optionally be used to support this functionality, such as a script used to select the element that is auto-selected within a faceplate.

The faceplate 302 has access to one or more data sources 334, which provide data updates to the faceplate 302 (such as via a binding engine). The data sources 334 also handle data changes, such as changes caused by an operator or by point control commands. The data sources 334 represent any suitable sources of data in a process control system. The data sources 334 could, for example, represent HONEYWELL EXPERION data sources. To support auto-selection, generic data objects in the data sources 334 could support a FireNextValueUpdate property, which causes a data object to trigger an update event regardless of whether the data object's value has changed (described in more detail below). A data source manager 336 contains the data sources 334 for the faceplate and the associated data elements. The server 322 here provides the data updates to the faceplate 302 and handles auto-selection and commands sent via the data source manager 336.

In this example, three data flows are shown. A first data flow occurs between the auto-select business logic 328 and the data sources 334. This data flow includes (i) data updates and "de-select commands" (used to de-select a selected element in a faceplate 302) from the data sources 334 and (ii) data changes and auto-selection commands from the page behavior 326. A second data flow represents data flowing between the command handling logic 330 and the data sources 334. This data flow includes selection-independent commands, such as mode changes and alarm acknowledgements. A third data flow occurs between the data sources 334 and the server 322. This data flow includes (i) auto-selection related commands and selection-independent commands for an object from the data sources 334 and (ii) data updates, de-select commands, HMI application-specific commands, and selection-independent commands from the server 322.

In the context shown in FIG. 3B, an auto-selection state 338 is defined in the server 322. The auto-selection state 338 controls whether auto-selection may occur in the faceplate 302. In this way, the auto-selection functionality for multiple faceplates 302 can be controlled using a single value on the server 322. In particular embodiments, the auto-selection state 338 (along with any other appropriate server information) can be sent by the server 322 on every page change occurring in the station 320, which may help to ensure that any changes on the server 322 are seen by the station 320 on the next page change. As a particular example, the value of the auto-selection state 338 could be sent by expanding the "server information" protocol to include a one-byte value representing the state 338.

FIG. 3C illustrates another example context in which the abstraction of faceplate functionality can be implemented. FIG. 3C is similar to FIG. 3B, except that the station 320 in FIG. 3C communicates with a console station 340, which itself communicates with a cluster server 342. In some embodiments, the software executing the station 320 may run on the console station 340 or on a station connected to the console station 340. Also, the third data flow from FIG. 3B occurs in FIG. 3C, although this data flow occurs between the console station 340 and the station 320 in FIG. 3C. In addition, a fourth data flow occurs between the console station 340 and the server 342 in FIG. 3C, where the fourth data flow involves replicating the value of an auto-selection state 344 between the server 342 and the console station 340. In particular embodiments, the auto-selection state 344 can be maintained on the server 342, and any changes to this value on the server 342 are replicated to one or more console stations 340.

Although FIGS. 3A through 3C illustrate examples of graphical faceplate operations in a process control system, various changes may be made to FIGS. 3A through 3C. For example, faceplate functionality could be abstracted in various ways, only one example of which is shown in FIG. 3A. Also, faceplates could be used in any suitable environment, only two examples of which are shown in FIGS. 3B and 3C.

FIGS. 4 through 11 illustrate an example graphical user interface 400 for defining graphical faceplates in a process control system according to this disclosure. The embodiment of the graphical user interface 400 shown in FIGS. 4 through 11 is for illustration only. Other embodiments of the graphical user interface 400 could be used without departing from the scope of this disclosure.

As noted above, various aspects of graphical faceplates (such as focus control and event and command handling) can be abstracted, and the graphical user interface 400 can be provided for defining faceplates in view of this abstraction. In some embodiments, to implement auto-selection behavior in a faceplate, various parameters for the faceplate can be declared using the graphical user interface 400. With these parameters declared, the business logic component 304 can implement the auto-selection behavior for the specified faceplate. Also, any changes or enhancements to faceplate behavior can be done in the business logic component 304, without requiring modification of individual faceplates (which could be numerous) in the system 100. The business logic component 304 may provide a property page (the graphical user interface 400) that allows for quick and intuitive declaration of the faceplate's relevant parameters (as well as for the configuration of other types of displays), and an example of the interface 400 is shown in FIG. 4.

Figure 4:
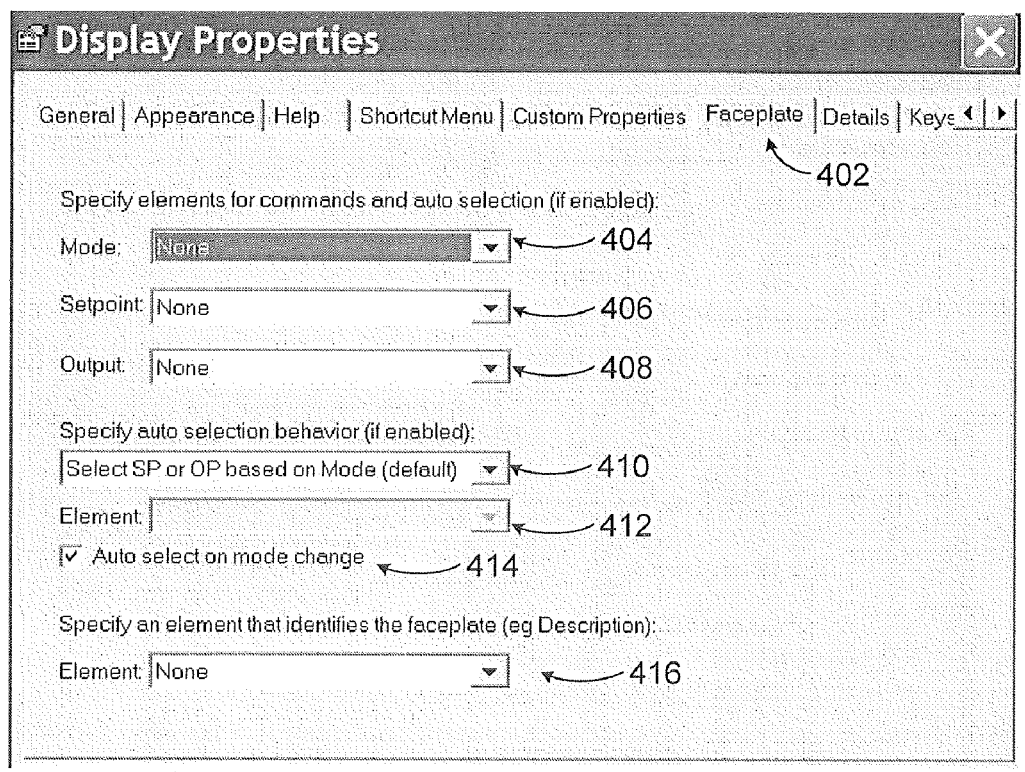
FIGS. 4 through 11 illustrate an example graphical user interface for defining auto-selection behavior of graphical faceplates according to this disclosure.

The graphical user interface 400 shown in FIG. 4 could be accessed in a number of ways. For example, a system designer or other personnel may wish to create a new faceplate and could invoke a "create faceplate" function. As another example, personnel may wish to convert an existing display (such as an existing faceplate without auto-selection functionality) into a faceplate with auto-selection functionality, and the personnel could open the existing display and invoke a "convert to faceplate" function. The HMI application 142 may or may not support a function for converting all existing faceplates to a format that supports auto-selection. The ability to create, modify, or otherwise generate a faceplate using the graphical user interface 400 could be invoked in any other suitable manner.

As shown in FIG. 4, the graphical user interface 400 includes various tabs 402, which can be selected by appropriate personnel. These tabs 402 are used to access various information and settings related to the configuration of Page-level display properties for a display. One of the tabs 402 is a faceplate tab, which allows the personnel to define a faceplate's auto-selection functionality. Selection of the "Faceplate" tab 402 presents the personnel with various controls 404-416, which can be used to specify the auto-selection behavior of the faceplate.

Figure 5:
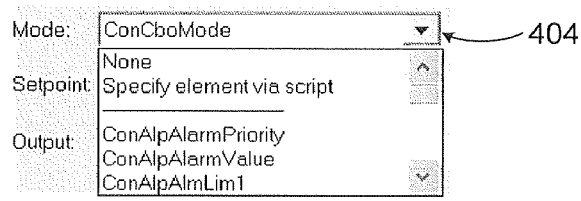
Figure 6:
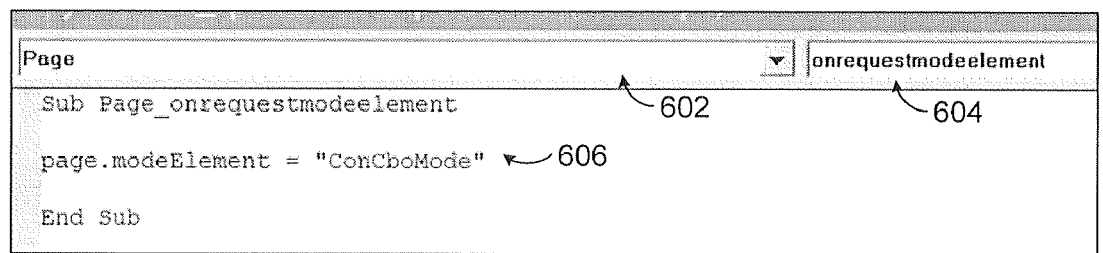

The control 404 is used to configure the mode of a faceplate. In this embodiment, the control 404 represents a drop-down menu, an example of which is shown in FIG. 5. Here, personnel are given the option of indicating that a faceplate has no mode (the "None" option), in which case auto-selection may not occur for the faceplate being configured. The control 404 also allows the personnel to define a mode using a script (the "Specify element via script" option), such as using a script 332. When this option is selected, the personnel could use a script definition tool 600 as shown in FIG. 6 to configure the appropriate script for the Page-level display, such as by defining the onrequestmodeelement event of the page. This event may be fired on the Page to identify the value of a modeElement parameter each time a mode element's identifier is needed. The script definition tool 600 includes a first drop-down menu 602 for selecting an element, a second drop-down menu 604 for selecting an event, and a text area 606 for textually defining a script. The control 404 further allows the personnel to select a mode using a list of data-bound elements currently associated with the faceplate being configured. The personnel can simply scroll down the list of names to find the desired mode element, which can be selected by the personnel. The personnel could also manually enter a mode element's identifier into the control 404.

Figure 7:
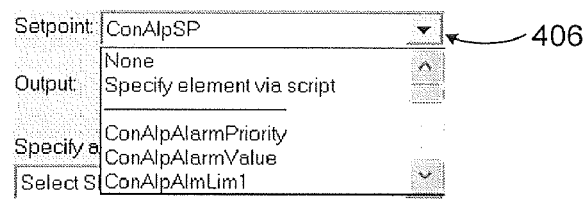

The control 406 is used to configure the setpoint element of a faceplate. In this embodiment, the control 406 represents a drop-down menu, an example of which is shown in FIG. 7. The control 406 operates in a similar manner as the control 404. For example, the control 406 allows personnel to select no setpoint element. In this case, auto-selection can still occur if, for example, the mode and output element are defined. The control 406 also allows the personnel to select a setpoint element using a script (such as a script 332). When this option is selected, the personnel could use the script definition tool 600 as shown in FIG. 6 to configure the appropriate script for the Page-level display, such as by defining the onrequestsetpointelement event of the page. This event may be fired on the Page to identify the value of a setpointElement parameter each time a setpoint element's identifier is needed. The control 406 further allows the personnel to select a setpoint element using a list of data-bound elements currently associated with the faceplate or to manually enter a setpoint element's identifier. The identification of a setpoint element may be required in order for auto-selection of the setpoint element to occur or for certain selection-independent commands (such as "Select SP") to be implemented.

Figure 8:
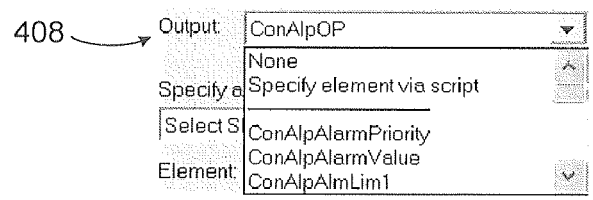

The control 408 is used to configure the output element of a faceplate. In this embodiment, the control 408 represents a drop-down menu, an example of which is shown in FIG. 8. The control 408 operates in a similar manner as the controls 404-408. For example, the control 408 allows personnel to select no output element, and auto-selection can still occur if, for example, the mode and setpoint element are defined. The control 408 also allows the personnel to select an output element using a script (such as a script 332). When this option is selected, the personnel could use the script definition tool 600 as shown in FIG. 6 to configure the appropriate script for the Page-level display, such as by defining the onrequestoutputelement event of the page. This event may be fired on the Page to identify the value of an outputElement parameter each time an output element's identifier is needed. The control 408 further allows the personnel to select an output element using a list of data-bound elements currently associated with the faceplate or to manually enter an output element's identifier. The identification of an output element may be required in order for auto-selection of the output element to occur or for certain selection-independent commands (such as "Select OP") to be implemented.

Figure 9:
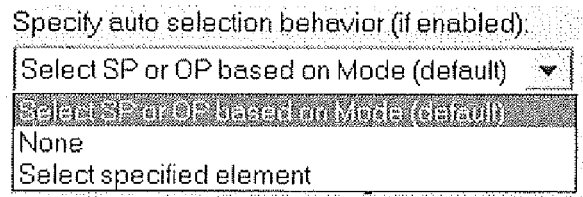
Figure 10:
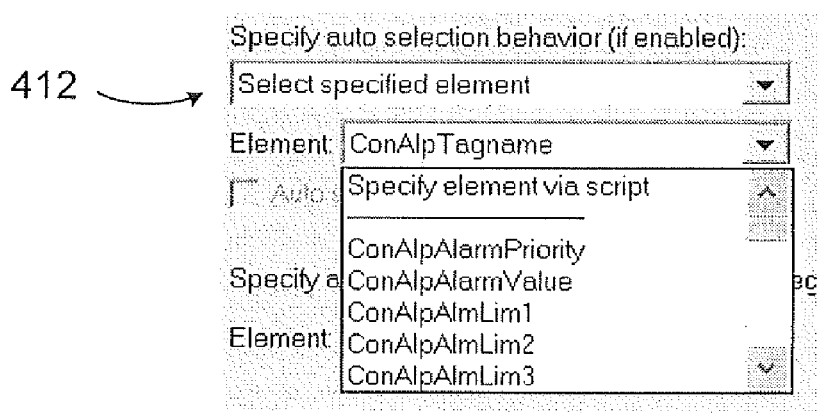

The controls 410-414 allow the personnel to specify whether and how auto-selection of an element occurs in the faceplate being configured. For example, the control 410 may represent a drop-down menu, an example of which is shown in FIG. 9. The first option in the control 410 allows the personnel to specify whether a setpoint or output element is auto-selected based on the mode. In particular embodiments, the setpoint element could be auto-selected when the mode is "Auto," the output element could be auto-selected when the mode is "Man," and no element could be auto-selected when a different mode is used. When this option is selected, the control 412 may not be accessible, and a checkbox 414 is selected (although the checkbox 414 could be de-selected by the personnel). The option for auto-selecting the setpoint or output element could be selected in the control 410 by default. The second and third options in the control 410 allow the personnel to disable auto-selection of an element and to specify a specific element that is auto-selected. The specific element can be defined using the control 412, which can include a drop-down menu such as that shown in FIG. 10. The specific element can be selected in the drop-down menu of FIG. 10, entered manually in the control 410, or specified using a script. When a script is selected, the personnel could use the script definition tool 600 as shown in FIG. 6 to configure the appropriate script for the Page-level display, such as by defining the onrequestappropriateelement event. This event may be fired on the Page to identify the value of a mostAppropriateElement parameter each time an element's identifier is needed.

Figure 11:
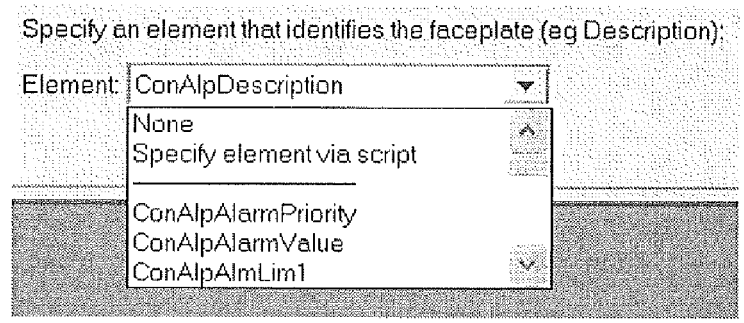

The control 416 determines how selection-independent commands are handled within the faceplate being configured. More specifically, the control 416 is used to give context to various selection-independent commands (such as alarm acknowledgement and group detail commands). When a selection-independent command is received, the command executes as if the target element identified by the control 416 is currently selected or in focus within the faceplate. This allows selection-independent commands to be executed even when the appropriate element in a faceplate does not have focus. In this example, the control 416 represents a drop-down menu, an example of which is shown in FIG. 11. The first option in the control 416 allows the personnel to disable the use of selection-independent commands. The control 416 also allows the personnel to select the target element for selection-independent commands using a list of target element identifiers, by manually entering a target element's identifier, or by identifying a target element using a script. When a script is selected, the personnel could use the script definition tool 600 as shown in FIG. 6 to configure the appropriate script for the Page-level display, such as by defining the onrequestcommandelement event. This event may be fired on the Page to identify the value of a commandElement parameter each time an element's identifier is needed. It may be noted that certain types of selection-independent commands may require execution on specific types of target elements (such as when a "Toggle Service" command requires execution on a data entry-enabled element). In particular embodiments, these types of commands might not be executed using the target element identified by the control 416.

In some embodiments, the auto-selection and selection-independent command handling features can be attached to the Page elements of faceplate-type displays using the following HTML definition:

```
<DIV class=" " id=Page style="FONT-SIZE: 12pt; MARGIN: 0px;
BEHAVIOR: url(#HDXPageBehavior) url(#StnEvtReflector)
url(#DisplayDataRepository)
url(#HSCFaceplateAutoSelectBehavior); WIDTH: 150px; ZOOM: 1;
FONT-FAMILY: Arial; POSITION: absolute; HEIGHT: 375px;
BACKGROUND-COLOR: transparent" PageType=Faceplate
OutputElement="xxxxxx" SetpointElement="yyyyyy"
ModeElement="zzzzzz">
```

This definition creates a faceplate that has a default size of 150 pixels wide by 375 pixels tall. The faceplate has an output element xxxxxx, a setpoint element yyyyyy, and a mode element zzzzzz (which can be defined using the graphical user interface 400). Additional parameters can also be added to this definition. For example, one parameter (denoted SelectionDefault) can be used to identify the element given focus in a faceplate when the mode changes to a value other than "Auto" or "Man" or when the mode has not been specified using the control 404. As a particular example, the mode element could be given focus if no other element has been specified. As another example, a parameter (denoted AlarmAckElem) can be used to acknowledge alarms when no data-bound element in the faceplate has focus. If an alarm acknowledge command is executed when no data-bound element has focus, the alarm acknowledgement can be executed on this "alarm acknowledge default." In particular embodiments, faceplates defined in this manner may be identical to other HMIWEB displays, except for the auto-selection and command handling behavior and the default size. Also, in particular embodiments, upon being loaded, the business logic component 304 could use this HTML definition to read the identifiers of the setpoint, output, and mode elements, retrieve pointers to the corresponding HTML elements, and not cache the element pointers.

In addition, in particular embodiments, auto-selection and selection-independent command handling may involve modifications to several protocols. For example, a "task request" protocol (for initiating a task) and a "data entry" protocol (for storing data) can be modified to identify whether a command is operator-initiated or script-initiated. Commands executed on non-selected elements (i.e. selection-independent commands) could be treated as script-initiated commands. Also, the "server information" protocol could be modified to return the names of different modes (such as "normal," "manual," and "auto" in that order). This may allow the auto-selection feature to "internationalize" the mode selection functionality by using appropriate terms in different languages.

Using the graphical user interface 400, personnel can quickly and easily configure a faceplate to support auto-selection of faceplate elements and to support execution of selection-independent commands. Moreover, these features can be enabled and disabled on a per-faceplate basis or on a larger basis (such as in sets of faceplates or all faceplates), and each faceplate can be configured appropriately. Further, in some embodiments, because these features can be executed by the business logic component 304, faceplate behavior may be more consistent across a number of faceplates. In addition, alterations or updates can be made to the business logic component 304 in a way that ensures more consistent upgrades and less regression in faceplate behavior. This means that defects in faceplate behavior can be improved or fixed more consistently, with fewer chances that an update creates defects in existing faceplates.

Although FIGS. 4 through 11 illustrate one example of a graphical user interface 400 for defining graphical faceplates in a process control system, various changes may be made to FIGS. 4 through 11. For example, the content and layout of the graphical user interface 400 are for illustration only and could be altered in any suitable manner. Also, the specific types of controls shown in FIGS. 4 through 11 are for illustration only, and any other suitable controls could be used to receive user input. As a particular example, FIGS. 4 through 11 illustrate the use of drop-down menus that include options such as "none" and "specify element via script" as well as specific data-bound elements. It may be noted that one drop-down menu could be used to select only the options "none," "specify element via script," and "specify element from a list." A separate drop-down menu could then be used if the personnel selects the "specify element from a list" option.

Any other or additional types of controls could be used with the graphical user interface 400.

FIGS. 12 through 15 illustrate example methods for auto-selection of elements to receive focus within graphical faceplates according to this disclosure. The embodiments of the methods shown in FIGS. 12 through 15 are for illustration only. Other embodiments of the methods could be used without departing from the scope of this disclosure.

In general, once a faceplate is defined and placed into use, the auto-selection of elements within the faceplates can be invoked in different ways. For example, an AutoSelect( ) method can be associated with each Page element and can allow for the auto-selection of elements within that page. As particular examples, when a faceplate is invoked for the first time during an operator session, the AutoSelect( ) method could be invoked to handle an OnPageComplete event from the Page element. This allows auto-selection of an element in the faceplate when the faceplate is first displayed to the operator. When an operator changes the mode associated with the faceplate, the AutoSelect( ) method could be invoked to handle an OnChange event from the Page element. This allows auto-selection of an element in the faceplate when the operator changes the mode in the faceplate. When an operator re-invokes a faceplate that has already been visible, a popup manager or window manager could give focus to that faceplate and invoke the AutoSelect( ) method. This allows auto-selection of an element in the faceplate when the faceplate is re-displayed to the operator.

Figure 12:
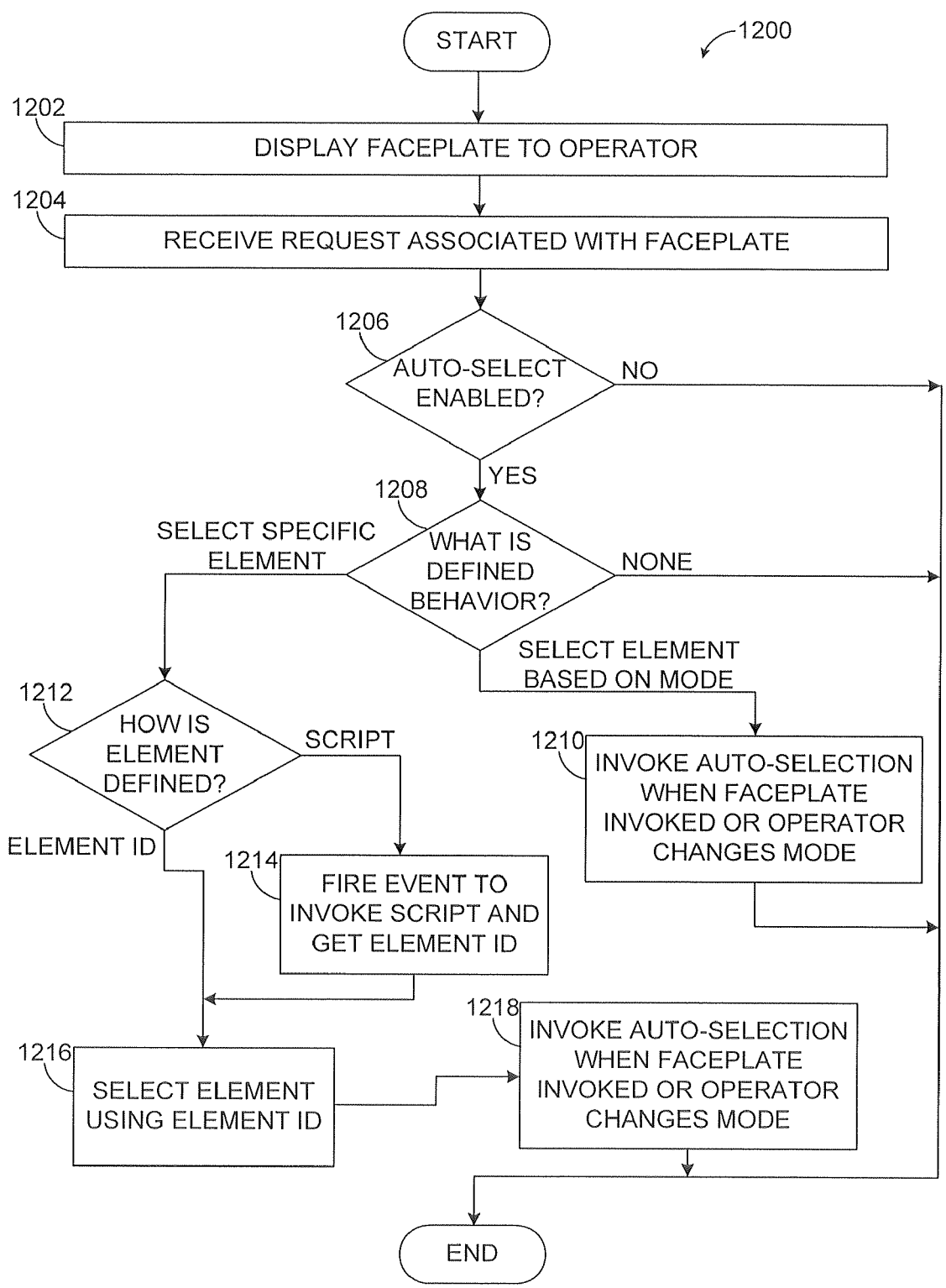
FIGS. 12 through 15 illustrate example methods for auto-selection of elements to receive focus within graphical faceplates according to this disclosure.

FIG. 12 illustrates an example method 1200 for performing auto-selection of elements in a graphical faceplate depending on the defined auto-selection behavior. As shown in FIG. 12, the method 1200 includes displaying a faceplate to an operator at step 1202. This could include, for example, the station 320 displaying a faceplate associated with a piece of industrial equipment selected by the operator. A request associated with the faceplate is received at step 1204. The request could include, for example, a request to open the faceplate for the first time during the operator's current session, a request to change a mode associated with the faceplate, or a request to re-invoke the faceplate.

A determination is made whether auto-selection is enabled at step 1206. This could include, for example, the station 320 determining whether an auto-selection state 338, 344 is enabled or disabled. If auto-selection is not enabled, the method 1200 ends, and no further actions may be taken regarding the auto-selection of an element in the faceplate. In this way, auto-selection can be enabled or disabled for all faceplates or for a group of faceplates in the process control system.

If auto-selection is enabled, a determination is made as to what the defined auto-selection behavior is for the faceplate at step 1208. This may include, for example, the station 320 determining the behavior for the faceplate that was specified using the control 410. In some embodiments, the default auto-selection behavior for faceplates may be to select the setpoint or output element based on the mode element's value. However, this behavior may not make sense for certain faceplates, such as for faceplates that are missing a combination of the setpoint, output, and mode elements. This may also be true for faceplates that have a very specific "most appropriate element" for selection or for faceplate that do not have an "appropriate element" (and therefore should not auto-select). To handle these cases, each faceplate can define its specific auto-selection behavior. If the defined auto-selection behavior is "none," the method 1200 ends, and auto-selection does not occur. In this way, auto-selection can be enabled or disabled for individual faceplates in the process control system.

If the defined auto-selection behavior involves selecting a setpoint or output element based on the mode, the auto-selection functionality is invoked when the faceplate is invoked or when an operator makes a mode change at step 1210. In this case, the mode associated with the faceplate may change over time, and auto-selection can occur when (i) the faceplate is invoked or re-invoked and displayed to the operator and (ii) the mode associated with the faceplate changes. In some embodiments, it is possible that auto-selection can be disabled even when one or more of these conditions are met. For instance, the station 320 could determine that another page is given focus by the operator after a faceplate is invoked and before auto-selection occurs. When that occurs, the auto-selection could be prevented from occurring in the now non-focused faceplate. Among other things, this may help to reduce or prevent selection race conditions.

If the defined auto-selection behavior involves selecting a specific element to be auto-selected, a determination is made how the specific element is defined at step 1212. This may include, for example, determining if the specific element was selected from a list of elements or defined using a script (via the control 412). If the specific element was selected from the list using the control 412, the element's identifier is already known. If a script was used, an event is fired to trigger execution of the script, and an identifier of the specific element is received at step 1214. This could include, for example, triggering the onrequestappropriateelement in the current Page element. In either case, the specific element is identified using the element's identifier at step 1216, and the auto-selection functionality is invoked when the faceplate is invoked or re-invoked at step 1218. In this situation, auto-selection can occur when the faceplate is invoked or re-invoked and displayed to the operator. As noted above, however, auto-selection may not occur even in this situation, such as when it is prevented to avoid selection race conditions.

Figure 13:
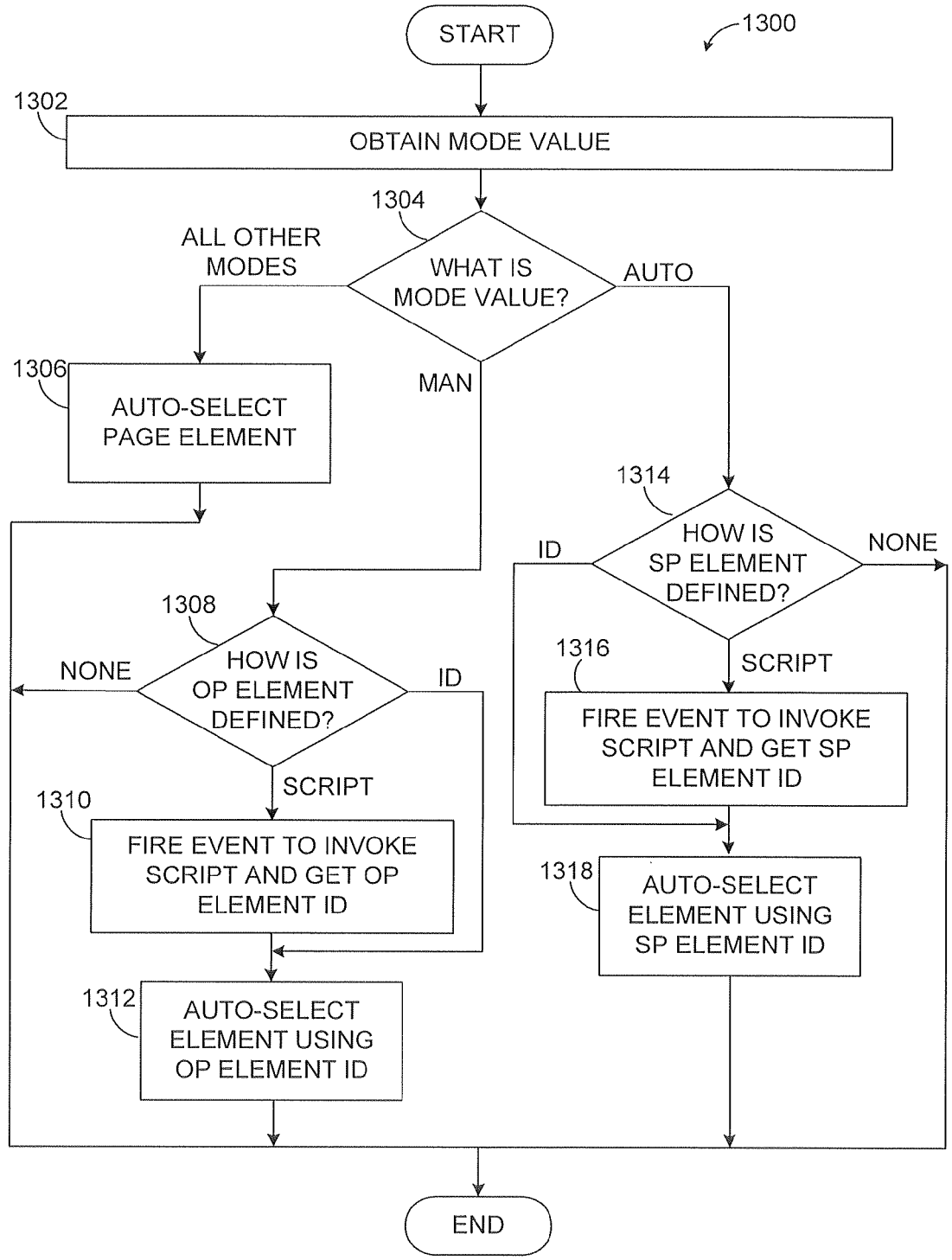

FIG. 13 illustrates an example method 1300 for performing auto-selection of an element when a faceplate is invoked or re-invoked and the element is being selected based on the faceplate's mode value. At the point where the method 1300 begins, a determination may already have been made whether auto-selection is enabled and whether the defined behavior for a specific faceplate allows auto-selection of an element based on mode. A determination could also have been made that no selection race condition exists.

As shown in FIG. 13, the method 1300 includes obtaining the mode value for the specific faceplate at step 1302. This could include, for example, the station 320 determining whether an identifier for the mode element in the faceplate has been defined. If not, the method 1300 could end since auto-selection may not occur without the proper mode value. If the mode element identifier is provided, this may also include the station 320 attempting to retrieve the mode element's pointer from an HTML document. If a pointer cannot be found, the method 1300 could end since the proper mode value cannot be located. With the pointer, the station 320 attempts to locate the mode element's data binding interface, and the method 1300 can end if the data binding interface cannot be located. Otherwise, the station 320 retrieves the mode element's current value from the data binding, which may help to ensure that the latest value for the mode is obtained. The station 320 can further perform a test to determine whether the obtained value is valid, such as by determining whether the mode value has an expected value or format (like whether the mode value is a string). If the mode value is proper, the method 1300 may proceed. A determination is made as to which mode is currently being used at step 1304. This may include, for example, the station 320 examining the mode value to determine whether it is "Auto," "Man," or some other value.

If the mode value is not "Auto" or "Man," the entire page element is auto-selected at step 1306. In this case, the auto-selection functionality may highlight or focus on the entire faceplate, rather than on an individual element within the faceplate. Note that this is for illustration only. Any other suitable action could occur at step 1306. In other embodiments, for instance, the mode element in the faceplate could be auto-selected in this case. The auto-selection of the mode element may or may not involve firing an event to cause a script to execute and return the mode element's identifier. This may not be necessary, such as when the mode element's identifier is obtained during step 1302.

If the obtained mode value is "Man," a determination is made how an output element in the faceplate is defined at step 1308. This may include, for example, the station 320 determining whether the control 408 was used to select "none," to select an output element from a list of elements, or to define an output element using a script. If "none" was selected, the method 1300 ends, and no auto-selection of the output element occurs. If the output element was selected from the list using the control 408, the output element's identifier is already known. If a script was used, an event is fired to trigger execution of the script, and an identifier of the output element is received at step 1310. This could include, for example, triggering the onrequestoutputelement in the current Page element. In either case, the output element is identified using the output element's identifier and auto-selected at step 1312. The output element in the faceplate can be auto-selected in any suitable manner, such as by highlighting the output element or otherwise placing focus on the output element in the faceplate.

If the obtained mode value is "Auto," a determination is made how a setpoint element is defined at step 1314. This may include, for example, the station 320 determining whether the control 406 was used to select "none," to select a setpoint element from a list of elements, or to define a setpoint element using a script. If "none" was selected, the method 1300 ends, and no auto-selection of the setpoint elements occurs. If the setpoint element was selected from the list using the control 406, the setpoint element's identifier is already known. If a script was used, an event is fired to trigger execution of the script, and an identifier of the setpoint element is received at step 1316. This could include, for example, triggering the onrequestsetpointelement in the current Page element. In either case, the setpoint element is identified using the setpoint element's identifier and auto-selected at step 1318. The setpoint element in the faceplate can be auto-selected in any suitable manner, such as by highlighting the setpoint element or otherwise placing focus on the setpoint element contained in the faceplate.

Figure 14:
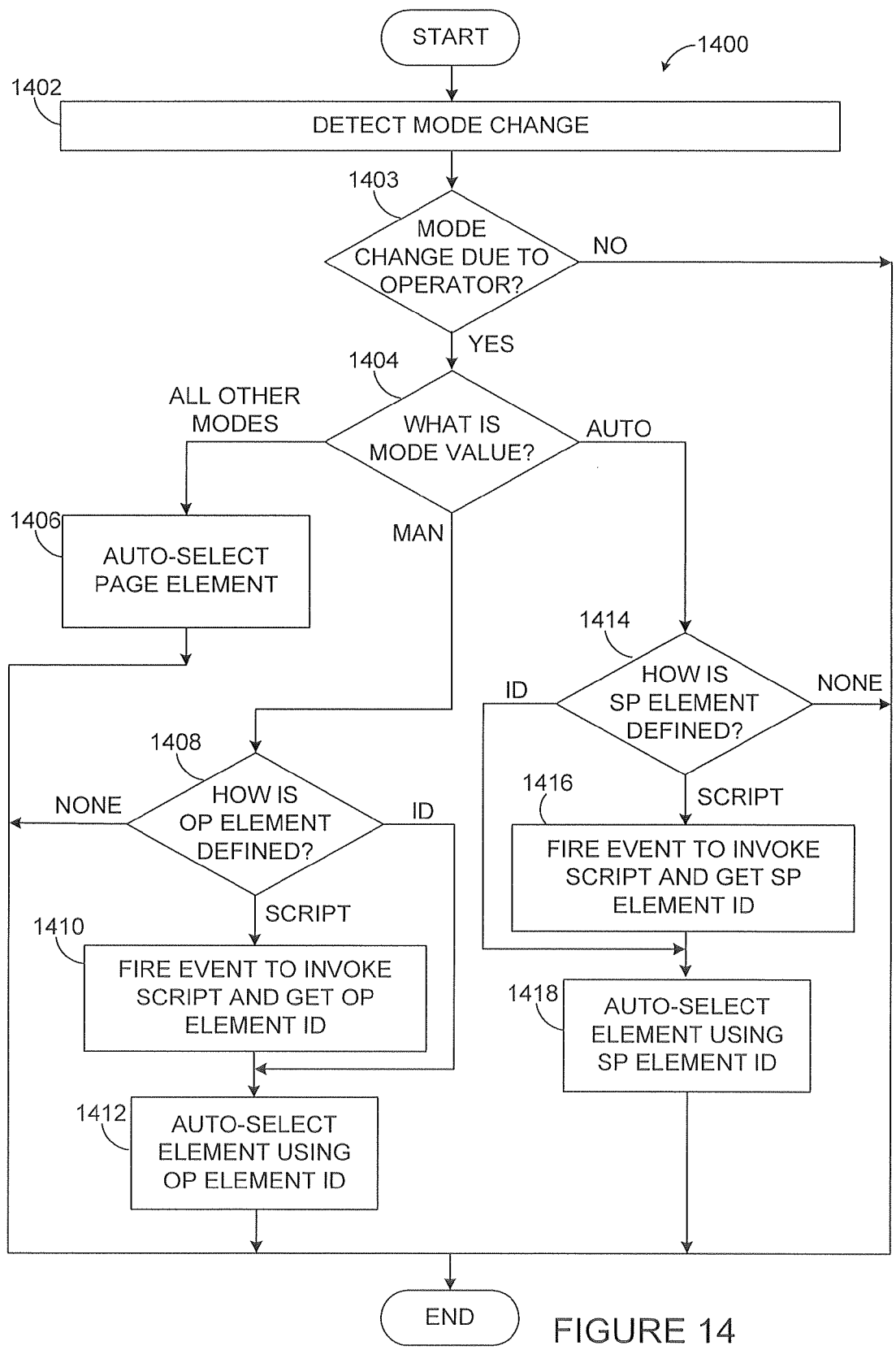

FIG. 14 illustrates an example method 1400 for performing auto-selection of an element after a mode change occurs within a faceplate. At the point where the method 1400 begins, a determination may already have been made whether auto-selection is enabled and whether the defined behavior for a specific faceplate allows auto-selection of an element based on mode. A determination could also have been made that no selection race condition exists.

As shown in FIG. 14, the method 1400 includes detecting a change in the mode value at step 1402. This may include, for example, the station 320 receiving a command from the operator to change the mode in the faceplate. The command could be submitted using a faceplate currently being displayed to the operator. The command could also be submitted by other elements within the process control system.

A determination is made as to whether the change in the mode was due to the operator at step 1403. This may include, for example, the station 320 determining whether the operator manually changed the mode using a keyboard, mouse, or other input device. If the operator did not initiate the mode change, the method 1400 ends. In this case, auto-selection may not be required since the operator is not the source of the mode change. Otherwise, steps 1404-1418 could be performed to auto-select the appropriate element on the displayed faceplate. Steps 1404-1418 may be the same as or similar to the corresponding steps 1304-1318 shown in FIG. 13 and described above.

Figure 15:
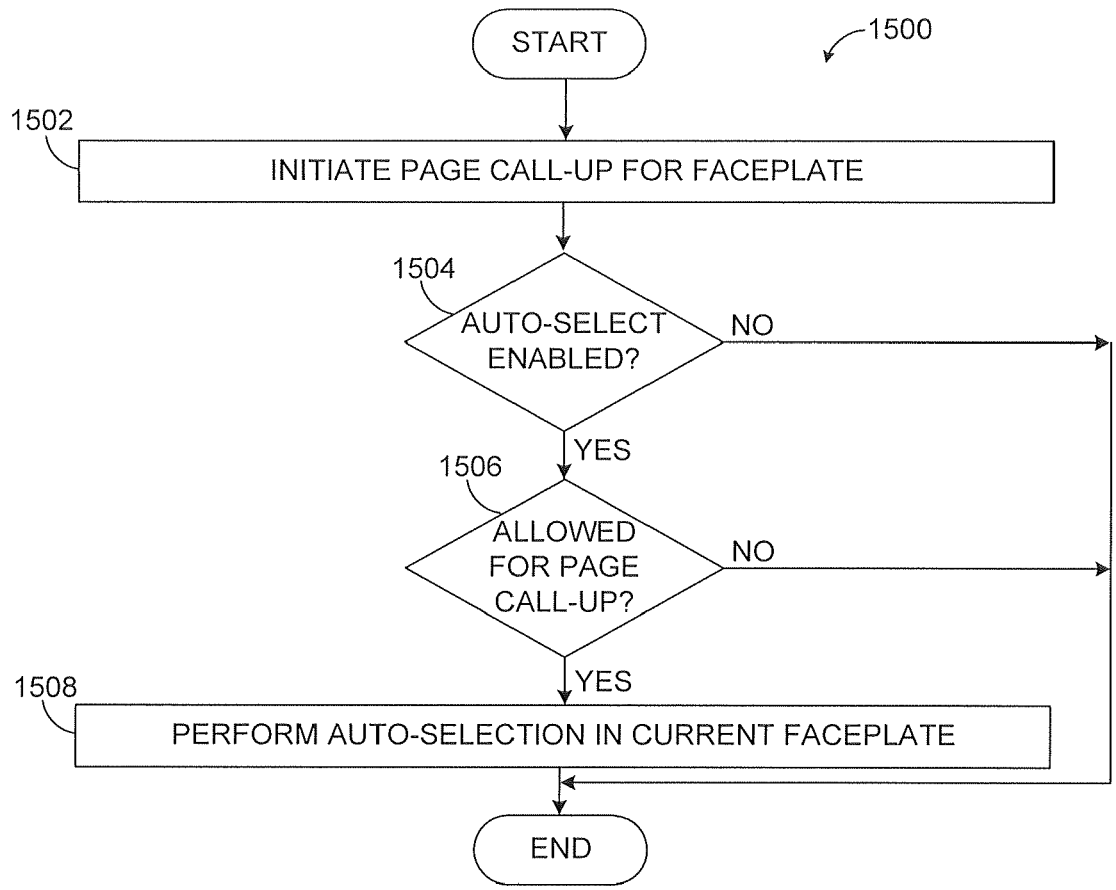

FIG. 15 illustrates an example method 1500 for avoiding race conditions during auto-selection of elements. As noted above, selection race conditions may sometimes occur when auto-selection functionality is being invoked. For example, in a multi-window station, an operator could be viewing an alarm summary and a customer display. In the customer display, the operator may click on a pump to see its faceplate. As the operator clicks on the pump, the operator notices an alarm in the alarm summary that needs urgent action. The operator clicks on the alarm in the alarm summary and attempts to select the <Detail> key in the alarm summary to go to the point detail display for the alarm. However, after the operator clicked on the alarm in the alarm summary and before the operator hits the <Detail> key, the faceplate the operator had requested loads and automatically selects the setpoint element. Instead of going to the detail display for the alarm, the operator is taken to the detail display for the point presented in the faceplate. The method 1500 helps to reduce or prevent these types of conditions from occurring.

As shown in FIG. 15, the method 1500 includes initiating a page call-up for a faceplate at step 1502. This could include, for example, the station 320 receiving a request from the operator to invoke or re-invoke a faceplate. When the station 320 executes a command that causes a page call-up, a flag (which could be denoted SetFocusonInvokedPage) can be set to true, indicating that the new page will receive focus when it is displayed. Also, the uniform resource locator (URL) of the page to receive focus can be recorded.

A determination is made whether auto-selection is enabled for the faceplate at step 1504. Again, this could include determining whether the auto-selection state 338, 344 is enabled or disabled. A determination is then made as to whether auto-selection is allowed for the current page call-up at step 1506. While the page is being loaded, if the operator directly gives focus to another display (such as via a mouse click), auto-selection for the current page call-up is not allowed. In this case, the flag can be set to false, and the URL of the page to receive focus can be cleared (such as set to blank). When the invoked page is almost loaded and ready to receive focus, the station 320 can check the flag to determine whether auto-selection is allowed for the current page call-up. If the flag is false, the method 1500 ends, and the current page call-up does not receive focus. Otherwise, the current page call-up receives focus and auto-selection occurs at step 1508, such as by using the various steps shown in FIGS. 13 and 14. The technique shown in FIG. 15 could be performed prior to any of the methods 1200-1400 shown in FIGS. 12-14 to help prevent selection race conditions from occurring during those methods 1200-1400.

In particular embodiments, the method 1500 can be implemented as follows. When the station 320 receives a request to present a particular display to an operator, the station 320 checks if the display is a faceplate. If so, the station 320 attempts auto-selection when the OnPageComplete event is fired on the Page element. When this event is fired, the faceplate checks with the station 320 via an IsSelectOnCallupAllowed method. This method can be added to the IHDXRuntimeFrameworkSite6 interface as follows:

```
interface IHDXRuntimeFrameworkSite6 : IHDXRuntimeFrameworkSite5
{
    HRESULT ExecuteHMICommandOnElement([in]BSTR bstrCmd,
        [in]BSTR bstrParam,
    [in]IHTMLElement* pSrcElement);
    HRESULT IsSelectOnCallupAllowed ([in]BSTR bstrPageURL,
        [in]BSTR bstrParam,
        [in,out]VARIANT* pvarbSelectAllowed);
};
```

This method can be passed the URL of the faceplate being invoked. If the station 320 has recorded that this page is meant to have focus, a pvarbSelectAllowed flag can be set to VARIANT_TRUE, and the faceplate can perform auto-selection. Otherwise, the flag can be set to VARIANT_FALSE, and auto-selection does not occur.

Although FIGS. 12 through 15 illustrate examples of methods for auto-selection of elements to receive focus within graphical faceplates, various changes may be made to FIGS. 12 through 15. For example, while the method in each figure is shown as a series of steps, various steps in each figure could overlap, occur in parallel, occur in a different order, or occur multiple times. Also, auto-selection of elements in a faceplate could occur at any suitable time and need not be performed only in response to a faceplate invocation/re-invocation or an operator mode change. Further, auto-selection is not limited to cases where setpoint or output elements are selected based on the mode or where an operator has selected a specific element. In addition, the element to be auto-selected could be identified in any suitable manner, whether or not scripts, user-supplied identifiers, or other information is used.

Figure 16:
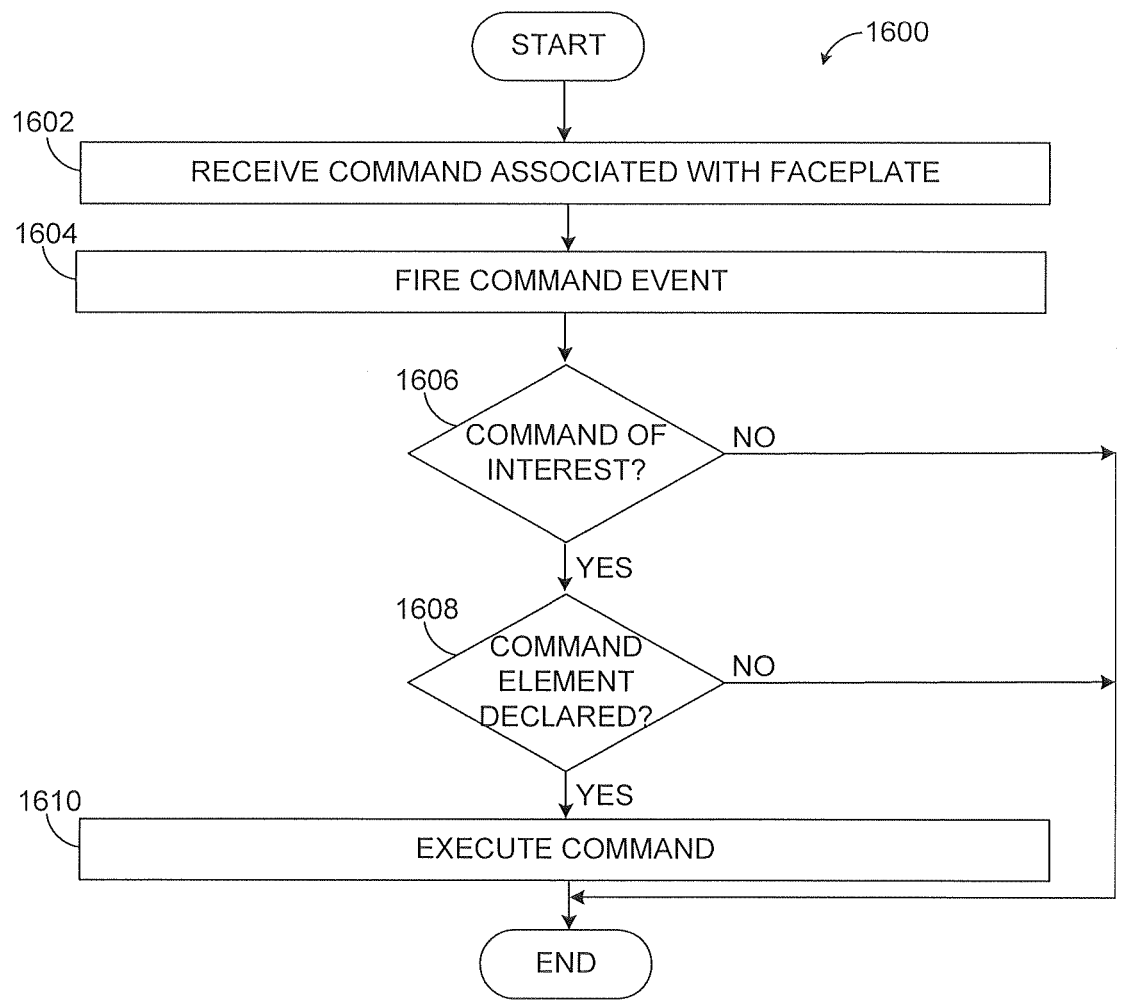
FIGS. 16 through 18 illustrate example methods for auto-selection related to selection-independent command handling within graphical faceplates according to this disclosure.
Figure 17:
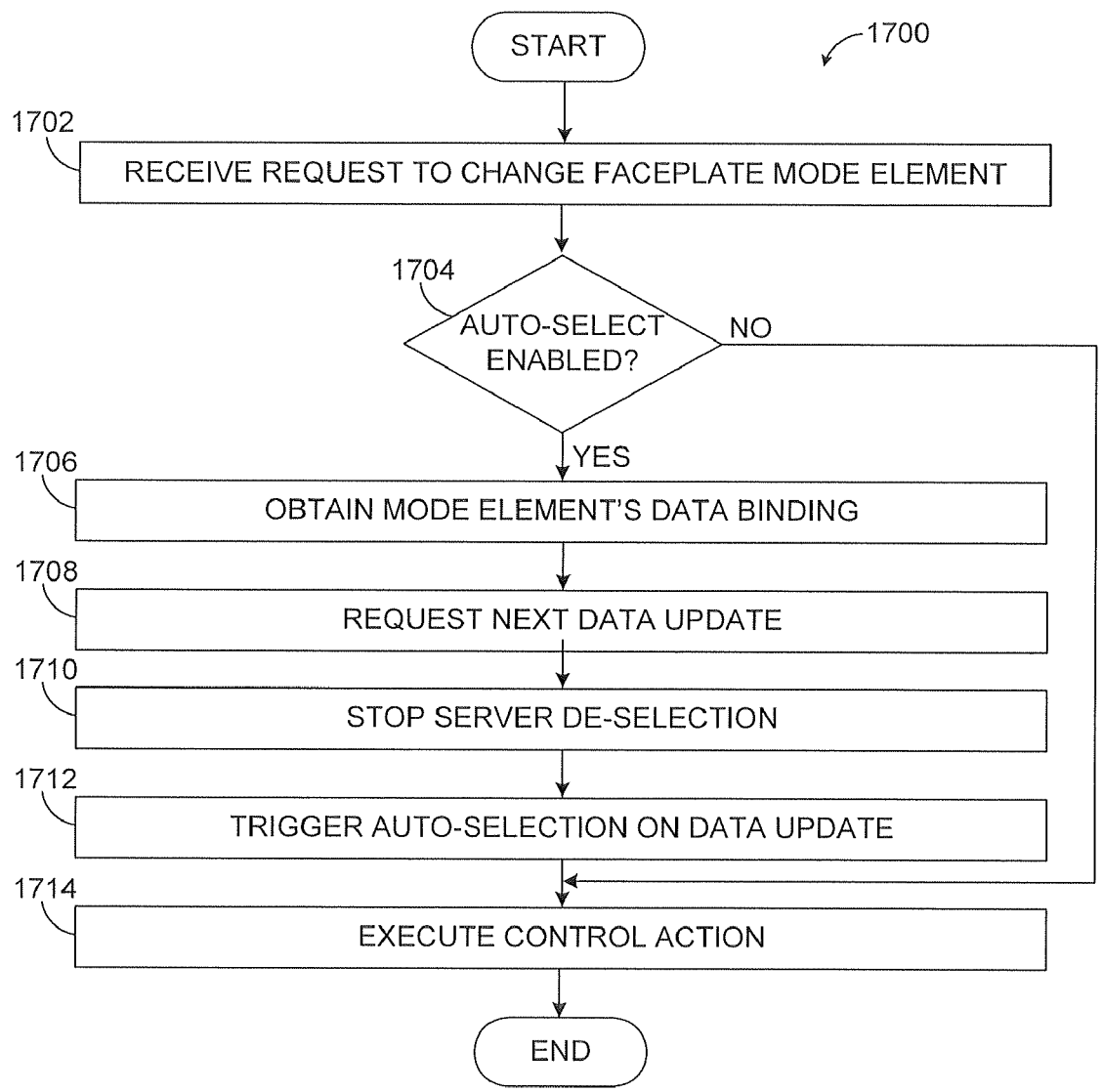
Figure 18:
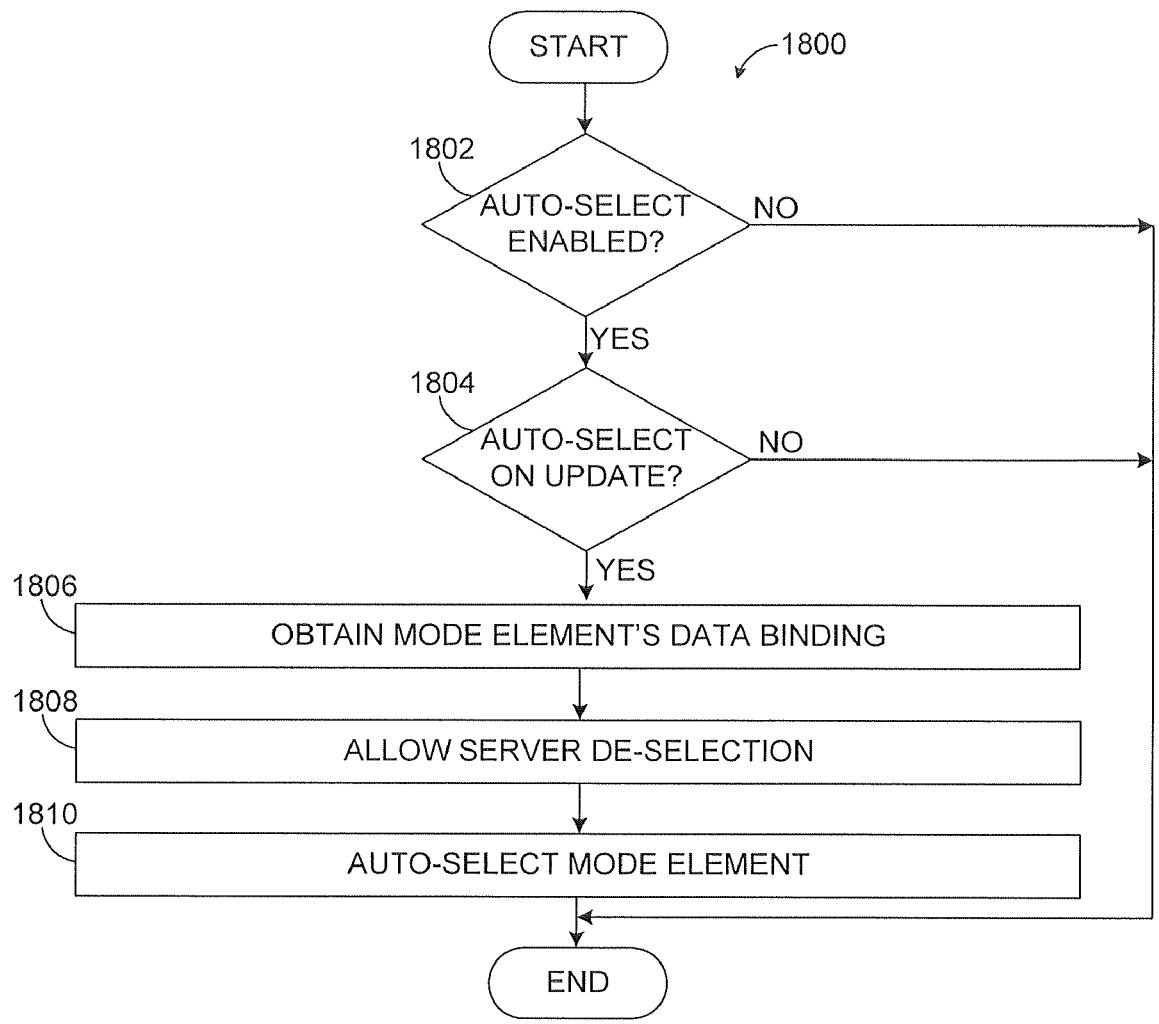

FIGS. 16 through 18 illustrate example methods for auto-selection related to selection-independent command handling within graphical faceplates according to this disclosure. The embodiments of the methods shown in FIGS. 16 through 18 are for illustration only. Other embodiments of the methods could be used without departing from the scope of this disclosure.

In general, once a faceplate is presented to an operator, selection-independent commands can be executed via the faceplate (regardless of which element has focus in the faceplate). FIG. 16 illustrates an example method 1600 for selection-independent command handling. As shown in FIG. 16, the method 1600 includes receiving a command associated with a faceplate at step 1602. This could include, for example, the station 320 receiving a command from an operator via a keyboard, mouse, or other input device as the operator is viewing a faceplate. As a particular example, the operator could invoke a command by selecting a keyboard shortcut associated with that command. A command event is fired at step 1604. This may include, for example, the faceplate or station 320 firing the OnExecuteCommand event to indicate that a command has been invoked.

A determination is made whether the command is a command of interest at step 1606. This may include, for example, the faceplate determining whether the requested command is a selection-independent command. If not, the method 1600 ends, and the command can be executed in any other suitable manner. Otherwise, if the command is selection-independent, a determination is made whether a faceplate element associated with the command has been declared at step 1608. This could include, for example, the business logic component 304 determining if an element in the faceplate has been identified for the command. The element could be defined in any suitable manner, such as by selecting the element from a list or by specifying the use a script via the control 416. The command element gives context to the command so that the command can execute successfully. If a command element is declared and identified, the command is executed at step 1610. This may include, for example, the business logic component 304 executing the command with the appropriate element in the faceplate. In this way, no element needs to be manually selected within the faceplate by the operator for the command to function successfully.

Any suitable selection-independent commands can be supported by the faceplates in a process control system. Example selection-independent commands may include "Select SP" (select setpoint element), "Select OP" (select output element), "Change Mode to Manual," "Change Mode to Auto," and "Change Mode to Normal." Other example selection-independent commands may include "Acknowledge Alarm," "Point Detail" (provides additional information about a particular selected element), "Group Display" (displays a graph associated with multiple process variables), "Trend Display" (displays a trend graph for a process variable), and "Associated Page" (displays additional information associated with a faceplate).

The "Select SP" and "Select OP" commands can be handled by simply focusing on the setpoint or output element in the displayed faceplate. The "Point Detail" command may not require any action by the faceplate and can be handled by the station 320. For example, if a data-bound element is selected when the "Point Detail" command is received, the station 320 can send the command to that element. If no data-bound element is selected, the station 320 can send the command to the element identified by the control 416. For the "Group Display," "Trend Display," and "Associated Display" commands, when the faceplate's auto-select behavior detects any of these commands, the auto-select behavior can check if a data-bound element is selected. If not, the auto-select behavior can use the station 320 to execute the command on one of the known data-bound elements (such as the setpoint, output, or mode element) selected using the control 416. This can be done via an ExecuteHMICommandOnElement method, which is described below.

The three "Change Mode" commands can be handled as shown in FIGS. 17 and 18. FIG. 17 illustrates an example method 1700 for changing the mode element in a faceplate. As shown in FIG. 17, a request to change the mode element of a faceplate is received at step 1702. This may include, for example, the station 320 receiving a mode change command from an operator via a keyboard, mouse, or other input device. The mode change command could involve changing the mode element to "Auto," "Man," "Normal," or other suitable value.

A determination is made whether auto-selection is enabled at step 1704. If not, selection-independent command handling is not available within the faceplate. At this point, the method 1700 skies to step 1714 and executes a requested control action (if appropriate) without auto-selection. This may include the faceplate changing the mode element if the mode element currently has focus.

If auto-selection is enabled, the mode element's data binding is obtained at step 1706, and a data update is requested for the mode element at step 1708. In this example, auto-selection relies on getting a data update to confirm or deny the control action. As noted above, the data sources 334 can send the next data update even if the value of the mode element has not changed. Server de-selection is stopped at step 1710, and auto-selection of the mode element is triggered in response to the next data update at step 1712. At that point, the mode change command is executed at step 1714 on the auto-selected mode element. Server de-selection refers to the ability of a server to de-select a focused element in the faceplate. By default, every control action could cause a data update and de-select to be sent from the server. When auto-selection is enabled, the de-select could cause timing problems and prevent auto-selection from occurring consistently. Therefore, when performing a mode control action, the station's framework 324 can be notified to ignore all server de-selects until further notice. As noted below, once the next data update is receive for the mode element, the station's framework 324 can be notified to start honoring de-selects from the server.

As shown in FIG. 17, the auto-selection is triggered on the next data update (step 1712). By default, auto-selection may not occur when the mode element receives a data update. If auto-selection occurred on every data update for the mode element, the faceplate could, for example, auto-select every time an operator on another station changed the mode. This may not be operationally safe. However, when an operator directly changes the mode on a faceplate viewed by that operator, auto-selection occurs in response to that mode change. In this case, auto-selection is triggered on a data update when initiating a mode control action. Once the next data update is received for the mode, auto-selection triggered on a data update is disabled once again.

This is shown in FIG. 18, which illustrates a method 1800 performed by an OnUpdate handler in the station 320 (where the handler is triggered upon a data update). As shown in FIG. 18, the method 1800 includes determining whether auto-selection is enabled at step 1802 and, if so, determining whether auto-selection is allowed on a data update at step 1804. As noted above, auto-selection on a data update to the mode element could be enabled at step 1712 in FIG. 17 and disabled at other times. If auto-selection is allowed, the mode element's data binding is obtained at step 1806, server de-selection is allowed at step 1808, and auto-selection of the mode element occurs at step 1810. This allows the OnUpdate handler to allow auto-selection during operator-initiated mode changes and to re-enable server de-selection at the proper time (after auto-selection on a data update has been allowed).

In particular embodiments, to handle the various selection-independent commands described above or other commands, a faceplate's auto-select behavior may handle the OnExecuteCommand event in the Page element. The OnExecuteCommand event may be fired on the Page element whenever a station command is about to be executed. Every toolbar, menu, and keyboard shortcut could have a corresponding station command, and the faceplate's auto-select behavior may be interested in the selection-independent commands for faceplates. Also, in particular embodiments, an ExecuteHMICommandOnElement method may be used by the faceplate's auto-select behavior when handling certain selection-independent commands. This method simulates the effect of selecting a specified element in the faceplate when a selection-independent command is executed. However, the method does not actually cause a selection within the faceplate, since the selection-independent command is executed on the specified element without actually selecting that element in the faceplate (so the element currently having focus retains focus). By simulating the effect of having a data-bound element selected when the command is executed, the station 320 can send the command to the server for the appropriate point and let the server/controller handle the command. No special logic may be required in script or code for this method. This method can be exposed at the station 320 via IHDXRuntimeFrameworkSite6 as follows:

```
interface IHDXRuntimeFrameworkSite6 : IHDXRuntimeFrameworkSite5
{
    HRESULT ExecuteHMICommandOnElement([in]BSTR bstrCmd,
    [in]BSTR bstrParam,
    [in]IHTMLElement* pSrcElement);
};
```

In addition, when the faceplate's auto-select behavior handles a selection-independent command, the faceplate may set a window.event.returnvalue flag to true. This can prevent the station 320 from attempting to perform the command and allows the faceplate's auto-select behavior to handle the command instead.

Although FIGS. 16 through 18 illustrate examples of methods for auto-selection related to selection-independent command handling within graphical faceplates, various changes may be made to FIGS. 16 through 18. For example, while the method in each figure is shown as a series of steps, various steps in each figure could overlap, occur in parallel, occur in a different order, or occur multiple times. Also, mode changes, alarm acknowledgements, and other selection-independent commands could be handled in any other suitable manner.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (PAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving at a faceplate controller information identifying a first faceplate being presented or to be presented to a user, the first faceplate associated with control of a process system and comprising two or more elements;
determining at the faceplate controller whether automatic selection of one of the elements in the first faceplate is to be performed by the faceplate controller or by a script associated with the first faceplate, the automatic selection enabling the user to invoke an operation involving the selected element without requiring the user to manually select that element in the first faceplate;
if the automatic selection is to be performed by the faceplate controller, outputting an identification of the element in the first faceplate to be automatically selected; and
if the automatic selection is to be performed by the script, outputting a trigger to cause the script to identify the element in the first faceplate to be automatically selected.

2. The method of claim 1, wherein the elements of the first faceplate comprise at least one of: a setpoint element, an output element, and a mode element.

3. The method of claim 1, wherein the identification of the element in the first faceplate to be automatically selected comprises an identification of an element to receive focus in the first faceplate.

4. The method of claim 3, wherein the element to receive focus in the first faceplate comprises at least one of:
a setpoint element or an output element, the setpoint element to receive focus when a mode element has a first value, the output element to receive focus when the mode element has a second value; and
a user-specified element.

5. The method of claim 4, wherein:
the setpoint element or the output element is to receive focus in the first faceplate in response to at least one of: an invocation of the first faceplate, a re-invocation of the first faceplate, and a change in the mode element; and
the user-specified element is to receive focus in the first faceplate in response to at least one of: the invocation of the first faceplate and the re-invocation of the first faceplate.

6. The method of claim 1, wherein the identification of the element in the first faceplate to be automatically selected comprises an identification of a specified element in the first faceplate associated with a command to be executed.

7. The method of claim 6, further comprising:
initiating execution of the command in association with the specified element, even when the specified element does not have focus in the first faceplate.

8. The method of claim 1, further comprising:
receiving, at the faceplate controller through a graphical user interface, an identification of whether the automatic selection of the element in the first faceplate is enabled and, if so, an identification of whether the automatic selection is to be performed by the faceplate controller or by the script, the graphical user interface configured to present information and settings related to configuration of multiple types of graphical displays.

9. The method of claim 1, wherein the first faceplate is associated with a piece of industrial equipment that is configured to be controlled by a process control system, the first faceplate configured to adjust the control of the piece of industrial equipment based on user input.

10. An apparatus comprising:
a memory configured to store:
information identifying one or more elements to be presented in each of multiple faceplates, the faceplates associated with control of a process system; and
information identifying an auto-selection behavior associated with each of the faceplates; and
a faceplate controller configured to control automatic selection of one element in a first of the faceplates in accordance with the auto-selection behavior associated with the first faceplate, wherein the faceplate controller is configured to control the automatic selection of the element in the first faceplate by:
determining at the faceplate controller whether the automatic selection of the element in the first faceplate is to be performed by the faceplate controller or by a script associated with the first faceplate;
if the automatic selection is to be performed by the faceplate controller, outputting an identification of the element in the first faceplate to be automatically selected; and
if the automatic selection is to be performed by the script, outputting a trigger to cause the script to identify the element in the first faceplate to be automatically selected;
wherein the faceplate controller is configured to automatically select the element in the first faceplate to enable a user to invoke an operation involving the selected element without requiring the user to manually select that element in the first faceplate.

11. The apparatus of claim 10, wherein the faceplate controller is further configured to automatically select the element in a second of the faceplates in accordance with the auto-selection behavior associated with the second faceplate.

12. The apparatus of claim 10, wherein:
the information identifying the auto-selection behavior associated with the first faceplate comprises an identification of the element to receive focus in the first faceplate; and
the faceplate controller is configured to control the automatic selection of the element in the first faceplate by automatically placing focus on the element in the first faceplate.

13. The apparatus of claim 12, wherein the faceplate controller is configured to control the automatic selection of the element in the first faceplate by automatically selecting at least one of:
a setpoint element or an output element, the setpoint element to receive focus when a mode element has a first value, the output element to receive focus when the mode element has a second value; and
a user-specified element.

14. The apparatus of claim 12, wherein the faceplate controller is further configured to:
determine when the user places focus on a graphical display other than the first faceplate before focus is placed on the element in the first faceplate and
refrain from placing focus on the element in the first faceplate in response to the determination.

15. The apparatus of claim 10, wherein the information identifying the auto-selection behavior associated with the first faceplate comprises an identification of a specified element in the first faceplate, the specified element associated with a command to be executed.

16. The apparatus of claim 15, wherein the faceplate controller is further configured to invoke execution of the command in association with the specified element, even when the specified element does not have focus in the first faceplate.

17. The apparatus of claim 10, wherein the faceplate controller is configured to receive the information identifying the one or more elements of the faceplates and the information identifying the auto-selection behavior of the faceplates through a graphical user interface, the graphical user interface configured to present information and settings related to configuration of multiple types of graphical displays.

18. The apparatus of claim 10, wherein the first faceplate is associated with a piece of industrial equipment that is configured to be controlled by a process control system, the first faceplate configured to adjust the control of the piece of industrial equipment based on user input.

19. A computer readable medium embodying a computer program, the computer program comprising:
   computer readable program code for receiving at a faceplate controller information identifying a first faceplate, the first faceplate associated with control of a process system and comprising one or more elements;
   computer readable program code for determining whether automatic selection of one element in the first faceplate is to be performed by the faceplate controller or by a script associated with the first faceplate, the automatic selection enabling a user to invoke an operation involving the selected element without requiring the user to manually select the element in the first faceplate;
   computer readable program code for, if the automatic selection is to be performed by the faceplate controller, outputting an identification of the element in the first faceplate to be automatically selected; and
   computer readable program code for, if the automatic selection is to be performed by the script, causing the script to identify the element in the first faceplate to be automatically selected.

20. The computer readable medium of claim 19, wherein the computer program further comprises:
   computer readable program code for presenting a graphical user interface, the graphical user interface configured to present information and settings related to configuration of multiple types of graphical displays.

21. The method of claim 1, wherein outputting the trigger comprises firing an event to trigger execution of the script.

* * * * *